US012798099B2

(12) United States Patent
Choi et al.

(10) Patent No.: US 12,798,099 B2
(45) Date of Patent: Nov. 17, 2026

(54) FASTENING VEHICLE AND GAS SUPPLY STAGE INCLUDING THE SAME

(71) Applicant: Samsung Electronics Co., Ltd., Suwon-si (KR)

(72) Inventors: Hyungho Choi, Suwon-si (KR); Kwangjun Kim, Suwon-si (KR); Jinho So, Suwon-si (KR); Huigwan Lee, Suwon-si (KR); Hyunkook Jeon, Suwon-si (KR); Soonwook Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 387 days.

(21) Appl. No.: 18/536,727

(22) Filed: Dec. 12, 2023

(65) Prior Publication Data

US 2024/0190006 A1 Jun. 13, 2024

(30) Foreign Application Priority Data

Dec. 13, 2022 (KR) ........................ 10-2022-0174199
Feb. 20, 2023 (KR) ........................ 10-2023-0022451

(51) Int. Cl.

| | |
|---|---|
| ***B25J 9/12*** | (2006.01) |
| ***B25J 9/08*** | (2006.01) |
| ***B25J 9/16*** | (2006.01) |
| *B25J 9/10* | (2006.01) |

(52) U.S. Cl.

CPC ............... *B25J 9/1679* (2013.01); *B25J 9/08* (2013.01); *B25J 9/106* (2013.01); *B25J 9/162* (2013.01); *B25J 9/1697* (2013.01)

(58) Field of Classification Search

CPC . B25J 9/1674; B25J 9/1692; B25J 5/00; B25J 9/1694; B25J 9/1679; B25J 9/0084; B25J 9/02; B25J 11/0085; B25J 13/088; B25J 19/027; B25J 9/142; B25J 9/102; B25J 9/1676; B25J 9/1661; B25J 19/0045; B25J 9/026; B25J 9/1653

See application file for complete search history.

(56) References Cited

U.S. PATENT DOCUMENTS

| | | | | |
|---|---|---|---|---|
| 11,320,094 | B2 | 5/2022 | Choi et al. | |
| 2019/0221458 | A1* | 7/2019 | Lu | C23C 16/45544 |
| 2021/0222834 | A1* | 7/2021 | Choi | F17C 13/04 |

(Continued)

FOREIGN PATENT DOCUMENTS

| | | | |
|---|---|---|---|
| KR | 102040713 | B1 | 11/2019 |
| KR | 102040716 | B1 | 11/2019 |

(Continued)

*Primary Examiner* — David Luo
*Assistant Examiner* — Charles S Laughlin
(74) *Attorney, Agent, or Firm* — Muir Patent Law, PLLC

(57) ABSTRACT

A gas supply stage includes a gas supply cabinet and a fastening vehicle. The gas supply cabinet includes a cabinet frame including an inner space configured to house a gas container and a holding module including a connector holder configured to be detachably fastened to a valve nozzle. The fastening vehicle includes a traveling unit configured to travel in a facility space in which the gas supply cabinet is installed, a multi-axis robot attached to the traveling unit, and a module gripper mounted to the multi-axis robot and configured to detachably grip a valve manipulation module and the holding module.

19 Claims, 23 Drawing Sheets

(56) References Cited

U.S. PATENT DOCUMENTS

| | | | |
|---|---|---|---|
| 2022/0274780 | A1 | 9/2022 | Byeon et al. |
| 2024/0145283 | A1* | 5/2024 | Nishikawa .......... H10P 72/1924 |

FOREIGN PATENT DOCUMENTS

| | | | |
|---|---|---|---|
| KR | 102132170 | B1 | 7/2020 |
| KR | 1020210014059 | A | 2/2021 |
| KR | 1020220105437 | A | 7/2022 |
| KR | 102440146 | B1 | 9/2022 |
| KR | 102452190 | B1 | 10/2022 |
| KR | 102492802 | B1 | 1/2023 |

* cited by examiner

FASTENING VEHICLE AND GAS SUPPLY STAGE INCLUDING THE SAME

CROSS-REFERENCE TO RELATED APPLICATION

This application is based on and claims priority under 35 U.S.C. § 119 to Korean Patent Application No. 10-2022-0174199, filed on Dec. 13, 2022, and 10-2023-0022451, filed on Feb. 20, 2023, in the Korean Intellectual Property Office, the disclosures of which are incorporated by reference herein in their entireties.

BACKGROUND

The inventive concept relates to a fastening vehicle and a gas supply stage including the same.

Gases used in a semiconductor manufacturing process are brought into a gas supply system in gas containers filled with the gases at high pressure. After the gas containers are mounted on gas supply cabinets, the gases in the gas containers may be supplied via gas supply lines to other facilities that perform the semiconductor manufacturing process. In general, a series of processes for handling the gas containers, such as conveying the gas containers and mounting the gas containers in the gas supply cabinets, have been performed manually by operators. During such work, there is a risk of injury to the operators when handling heavy gas containers, and also, there is a risk of safety accidents and fire if toxic and/or flammable gas leaks.

SUMMARY

The inventive concept provides a fastening vehicle capable of reducing a work load on an operator and a gas supply stage including the same.

Also, the objects of the inventive concept are not limited to the aforementioned object, but other objects not described herein will be clearly understood by those skilled in the art from the following description.

According to an aspect of the inventive concept, there is provided a gas supply stage including a gas supply cabinet and a fastening vehicle. The gas supply cabinet includes a cabinet frame and a holding module. The cabinet frame includes an inner space configured to house a gas container and the holding module includes a connector holder configured to be detachably fastened to a valve nozzle of a valve structure of the gas container and includes a gas nozzle configured to be in fluid communication with a flow path of the valve nozzle when the connector holder is fastened to the valve nozzle. The fastening vehicle includes a traveling unit configured to travel in a facility space in which the gas supply cabinet is installed, a multi-axis robot having a first end attached to the traveling unit and moving together with the traveling unit, and a module gripper mounted to a second end of the multi-axis robot and configured to detachably grip the holding module.

According to an aspect of the inventive concept, there is provided a gas supply stage including a gas supply cabinet and a fastening vehicle. The gas supply cabinet includes a cabinet frame including an inner space configured to house a gas container, a valve manipulation module configured to manipulate a valve structure of a gas container placed in the inner space between an open position at which a gas is allowed to be discharged via a valve nozzle of the valve structure and a closed position at which the gas is not allowed to be discharged via the valve nozzle, and a holding module that includes a connector holder that is configured to be detachably fastened to the valve nozzle and that includes a gas nozzle communicating with a flow path of the valve nozzle when the connection holder is fastened to the valve nozzle. The fastening vehicle includes a traveling unit configured to travel in a facility space in which the gas supply cabinet is installed, a multi-axis robot having a first end attached to the traveling unit and moving together with the traveling unit, and a module gripper mounted to a second end of the multi-axis robot and configured to detachably grip at least one of the valve manipulation module and the holding module.

According to another aspect of the inventive concept, there is provided a gas supply stage including a gas supply cabinet and a fastening vehicle. The gas supply cabinet includes a cabinet frame including an inner space in which a gas container is placed, and a holding module that includes a connector holder that is configured to be detachably fastened to the valve nozzle and that includes a gas nozzle communicating with a flow path of the valve nozzle when the connection holder is fastened to the valve nozzle. The fastening vehicle includes a traveling unit configured to travel in a facility space in which the gas supply cabinet is installed, a plurality of multi-axis robots, each of which has one a first end connected to the traveling unit and moves together with the traveling unit, and a module gripper connected to a second end of one of the plurality of multi-axis robots and that is configured to detachably grip the holding module.

According to another aspect of the inventive concept, there is provided a gas supply stage including a plurality of gas supply cabinets and a fastening vehicle. Each of the gas supply cabinets includes a cabinet frame including an inner space configured to receive a gas container, a valve manipulation module configured to manipulate a valve structure of a gas container placed in the inner space between an open position at which a gas is allowed to be discharged via a valve nozzle of the valve structure and a closed position at which the gas is not allowed to be discharged via the valve nozzle, and a holding module that includes a connector holder that is configured to be detachably fastened to the valve nozzle and includes a gas nozzle communicating with a flow path of the valve nozzle when the connector holder is fastened to the valve nozzle. The fastening vehicle includes a traveling unit configured to travel between the plurality of gas supply cabinets, a multi-axis robot having a first end attached to the traveling unit and moving together with the traveling unit, and a module gripper mounted to a second end of the multi-axis robot and configured to detachably grip at least one of the valve manipulation module and the holding module, wherein the module gripper of the fastening vehicle includes a power transmission shaft configured to be inserted into the valve manipulation module or the holding module and to provide power to the valve manipulation module or the holding module into which the power transmission shaft is inserted, and the gas supply cabinet includes a holder on which at least one of the valve manipulation module and the holding module is mounted.

According to another aspect of the inventive concept, there is provided a method of fastening and separating a gas container in a gas supply stage. The gas supply stage includes a gas supply cabinet in which the gas container is mounted, a fastening vehicle configured to travel in a facility space in which the gas supply cabinet is installed and to fasten the gas container to or separate the gas container from the gas supply cabinet, and a superordinate system. The method includes determining, by the gas supply cabinet, that the gas container mounted thereon has been used up, determining, by the gas supply cabinet, that the gas container is required to be replaced and sending a first signal to the superordinate system, receiving, by the superordinate system, the signal from the gas supply cabinet and sending a second signal for moving the fastening vehicle to the gas supply cabinet, separating, by the fastening vehicle, a valve nozzle of the gas container from a gas nozzle of the gas supply cabinet, replacing the gas container separated from the gas supply cabinet with a new gas container, and fastening, by the fastening vehicle, a valve nozzle of the new gas container to the gas nozzle of the gas supply cabinet.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Figure 1:
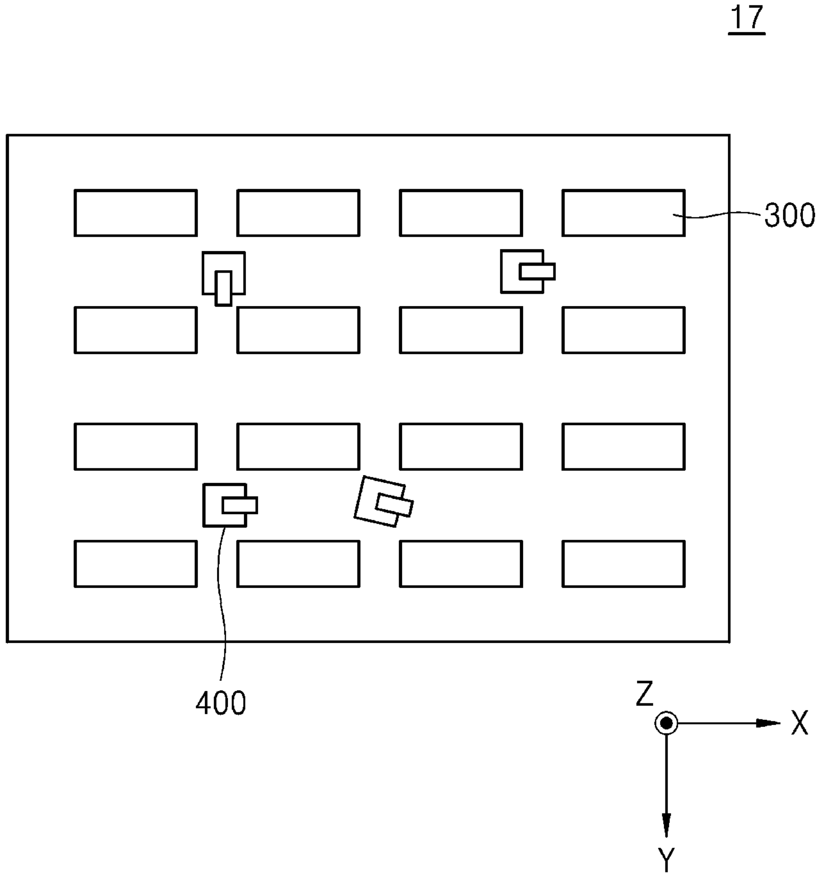
FIG. 1 is a configuration diagram schematically illustrating a gas supply stage according to some embodiments.

The inventive concept will be described more fully with reference to the accompanying drawings, in which various embodiments are shown. The inventive concept may, however, be embodied in various forms, and thus, not all embodiments are illustrated in the drawings and described in detail. However, this is not intended to limit embodiments to the specific embodiments of the drawings.

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element (or using any form of the word "contact"), there are no intervening elements present at the point of contact.

As used herein, items described as being "fluidly connected" or "in fluid communication" are configured such that a liquid or gas can flow, or be passed, from one item to the other. As used herein, unless otherwise indicated by the context, items that "communicate" with one another may pass a liquid or gas between one another. As used herein, a "flow path" is a path along which a fluid is capable of moving.

Figure 2:
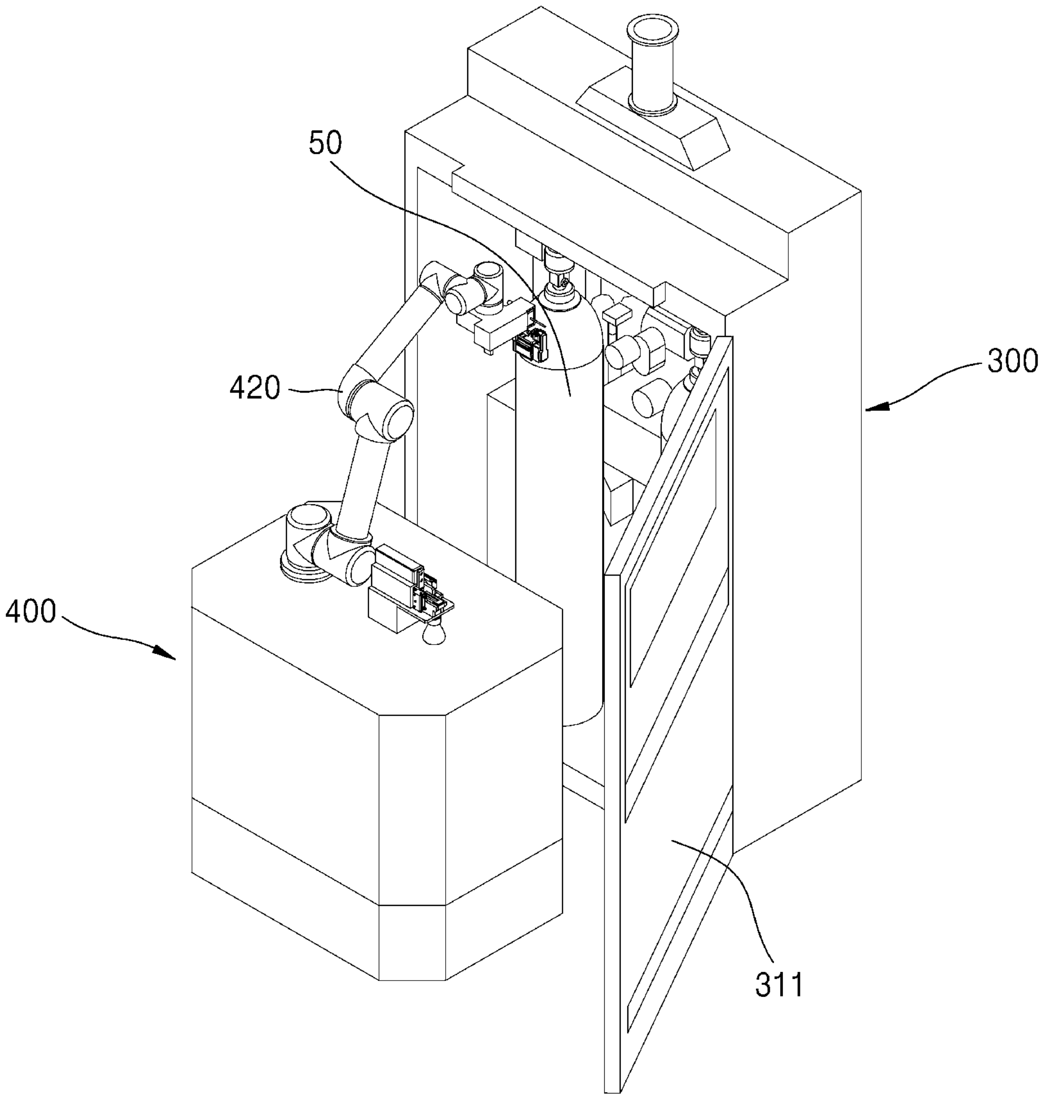
FIG. 2 is a perspective view schematically illustrating a gas supply cabinet and a fastening vehicle of FIG. 1 according to some embodiments.

FIG. 1 is a configuration diagram schematically illustrating a gas supply stage 17 according to some embodiments. The configuration diagram represents a general overhead view of the gas supply stage 17. FIG. 2 is a perspective view schematically illustrating an example of a gas supply cabinet 300 and a fastening vehicle 400 in accordance with some embodiments.

Referring to FIGS. 1 and 2, the gas supply stage 17 may include one or more gas supply cabinets 300 and the fastening vehicle 400 that travels between the gas supply cabinets 300.

Each of the gas supply cabinets 300 may be equipped with one or more gas containers 50. The number of gas containers 50 mounted in one gas supply cabinet 300 may be appropriately adjusted according to the usage and replacement cycle of various gases required for a semiconductor process.

Figure 18:
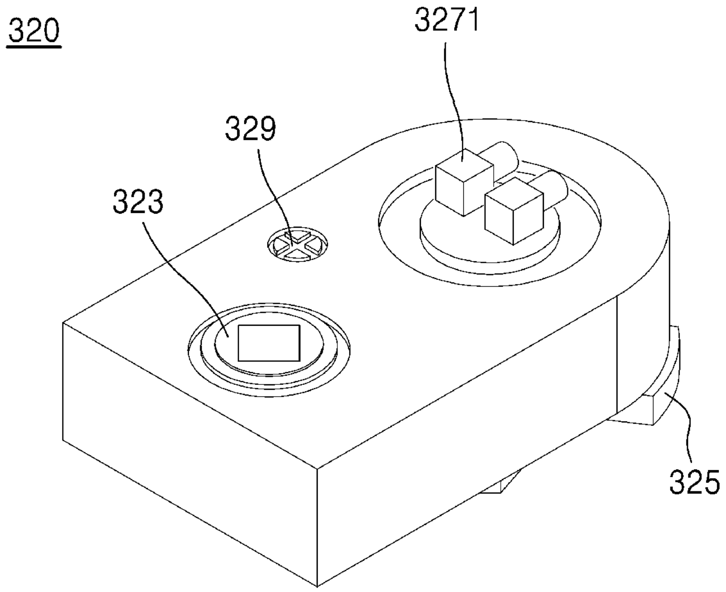
FIGS. 18 and 19 are perspective views schematically illustrating a valve manipulation module according to some embodiments.
Figure 19:
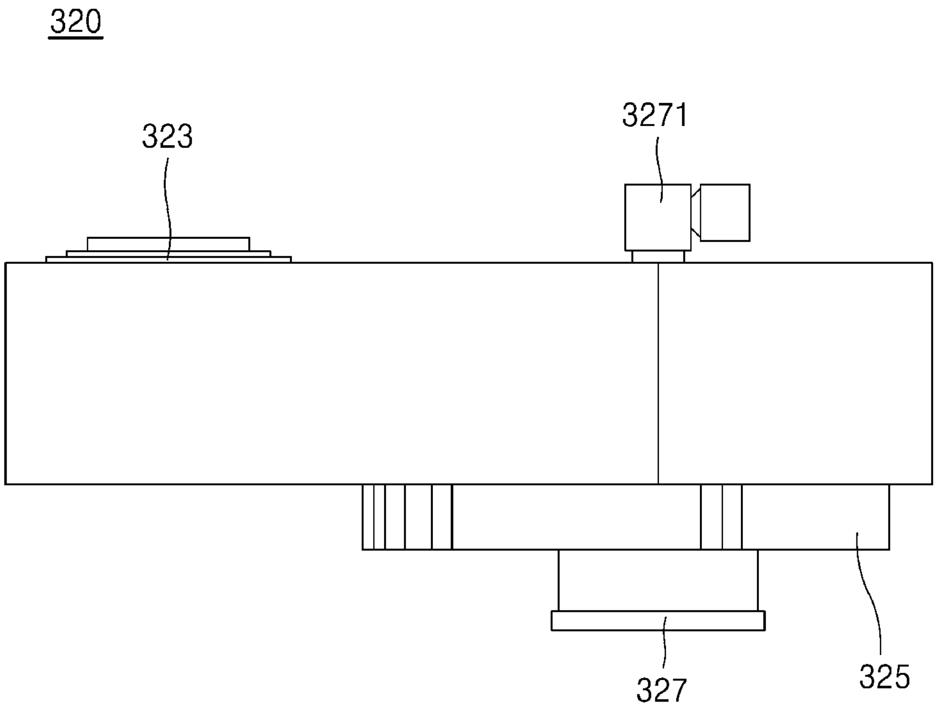

The gas supply cabinet 300 may include a holding module 330 (see FIGS. 15 and 16) and a valve manipulation module 320 (see FIGS. 18 and 19). The holding module 330 may be configured to couple to a fitting, outlet, or connection of a gas container 50 (hereafter referred to as a valve nozzle) in accordance with standards set by the Compressed Gas Association (CGA) The holding module 330 and the valve manipulation module 320 may be fastened to each of the gas containers 50 or mounted on a holder (e.g., first holder 391 or the second holder 392). In some embodiments, the valve manipulation module 320 may be omitted.

The holding module 330 and the valve manipulation module 320 may be detachably gripped by a first multi-axis robot 420 of the fastening vehicle 400. The holding module 330 and the valve manipulation module 320 may be operated while being gripped by the first multi-axis robot 420 of the fastening vehicle 400. Specifically, the holding module 330 and the valve manipulation module 320 may be operated by a power transmission shaft of the first multi-axis robot 420.

The gas supply cabinet 300 may be configured to supply gases to semiconductor manufacturing equipment (e.g., process chambers, such as a deposition chamber or an etching chamber) configured to perform a semiconductor process. The gas supply cabinet 300 may be connected to the semiconductor manufacturing equipment via a gas connection pipe. The gas connection pipe may be connected to the holding module 330. The gas discharged from the gas container 50 mounted in the gas supply cabinet 300 may be supplied to the semiconductor manufacturing equipment via the gas connection pipe. The gas container may be detachably connected to the gas connection pipe via the holding module 330.

Figure 3:
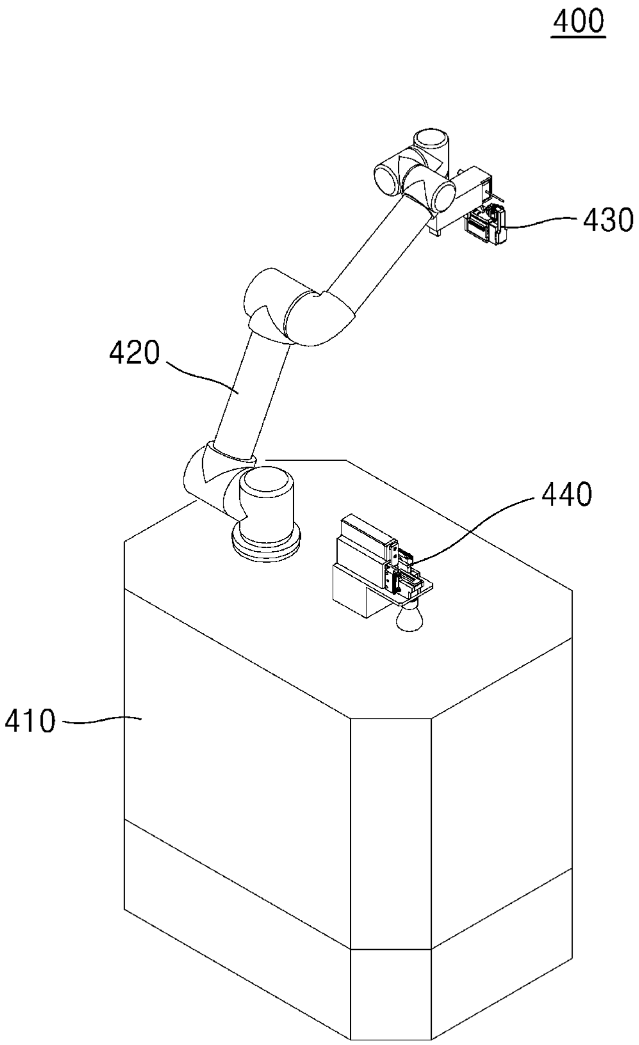
FIGS. 3 and 4 are perspective views schematically illustrating the fastening vehicle of FIG. 1 according to some embodiments.

The fastening vehicle 400 may include a traveling unit 410 (see FIG. 3), the first multi-axis robot 420, and a module gripper 430 (see FIG. 3). The first multi-axis robot 420 and the module gripper 430 are attached to the traveling unit 410 of the fastening vehicle 400, and as the traveling unit 410 travels between the gas supply cabinets 300, the first multi-axis robot 420 and the module gripper 430 may move together.

In some embodiments, the gas supply stage 17 may include a transfer robot (not shown) configured to transfer gas containers 50. The transfer robot may hold the gas container 50 and convey the gas container 50 by moving while holding the gas container 50. Through a mutual interface with a storage queue for temporarily loading the gas container 50, the transfer robot may load the gas container 50 into an intended loading port in the storage queue. Also, through a mutual interface with the gas supply cabinet 300, the transfer robot may load the gas container 50 into an intended loading port of the gas supply cabinet 300. In addition, the transfer robot may receive a gas container 50, in which the gas is used up (e.g., empty), from the gas supply cabinet 300 and transfer the gas container 50 to the storage queue.

Hereinafter, an example operation of the gas supply stage 17 is briefly described. The method of fastening and separating a gas container may include: determining, by the gas supply cabinet 300, when the gas container 50 should be replaced; sending, by the gas supply cabinet 300, a signal for replacing the gas container 50 to a superordinate system; sending, by the superordinate system receiving the signal, a signal to the fastening vehicle 400 so that the fastening vehicle 400 moves to the gas supply cabinet 300; gripping, by the fastening vehicle 400, a holding module 330 (see FIG. 15) and separating a gas nozzle 3313 (see FIG. 15) of the gas supply cabinet 300 from a valve nozzle 53 (see FIG. 14) of the gas container 50; replacing, by a transport vehicle, the gas container 50 in the gas supply cabinet 300; and gripping, by the fastening vehicle 400, the holding module 330 and fastening a valve nozzle 53 of a new gas container 50 to the gas nozzle 3313 of the gas supply cabinet 300. In some embodiments, the method may include: gripping, by the fastening vehicle 400, a valve manipulation module 320 (see FIG. 18) and manipulating a valve structure 51 (see FIG. 14) of the gas container 50 to a closed position; and gripping, by the fastening vehicle 400, the valve manipulation module 320 and manipulating the valve structure 51 of the gas container 50 to an open position.

Specifically, when the gas of the gas container 50 loaded in the gas supply cabinet 300 is used up (e.g., consumed), the gas supply cabinet 300 determines that the gas container 50 should be replaced using a sensor such as a weight sensor configured to measure the weight of the gas container 50 or a pressure sensor configured to measure the pressure inside the gas container 50. When the replacement of the gas container 50 is required, this information (e.g., a signal requesting replacement and/or representing the weight/pressure of the gas container 50) is reported to the superordinate system. For example, the superordinate system receiving the reported information may, in response, perform an operation of exchanging the gas container 50 using the fastening vehicle 400 and/or the transport vehicle.

The superordinate system is configured to control the overall process through the gas supply stage 17 and may be referred to as a main controller. Although not illustrated, a controller, such as the superordinate system, can include one or more of at least one central processing unit (CPU) configured to execute computer program instructions to perform various processes and methods, memory devices, such as read only memory (ROM) and random access memory (RAM) configured to access and store data and information and computer program instructions, computer program input/output (I/O) devices configured to provide input and/or output to the central processing unit (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored, a power source that provides an appropriate alternating current (AC) or direct current (DC) to power one or more components of the controller, and a bus that allows communication among the various disclosed components of the controller. In addition, the controller may include a receiver and a transmitter for receiving and transmitting electrical signals which may include network interfaces that provide wireless and/or wire line digital and/or analog interface to one or more communication networks over one or more network connections (not shown).

In addition to the superordinate system, subordinate systems such as the gas supply cabinet 300, the fastening vehicle 400, and/or the transport vehicle may each include a controller for performing operations such as communicating with the superordinate system and controlling local operations.

In some embodiments, the superordinate system may transmit a signal to or receive a signal from the gas supply cabinet 300 (e.g., a controller of the gas supply cabinet 300) and the fastening vehicle 400 (e.g., a controller of the fastening vehicle 400). In addition, when the gas supply stage 17 includes a plurality of fastening vehicles 400, the superordinate system may track the positions of the plurality of fastening vehicles 400 in real time. For example, each fastening vehicle 400 may share their position with the superordinate system. The superordinate system receiving the report information (e.g., a request to replace a gas container 50) may cause (e.g., send a signal to move) the fastening vehicle 400 closest to the gas supply cabinet 300 requesting replacement to move from among the plurality of fastening vehicles 400.

In some embodiments, when the superordinate system receives the signal for replacing the gas container 50 from the gas supply cabinet 300, the superordinate system may send a signal to the fastening vehicle 400 to cause the fastening vehicle 400 to move to the gas supply cabinet 300 and separate the gas container 50 from the gas supply cabinet 300.

Specifically, the fastening vehicle 400 receiving the signal may move to the gas supply cabinet 300 from which the gas container 50 is to be separated. When the fastening vehicle 400 arrives at the gas container 50, the fastening vehicle 400 may grip the holding module 330 (see FIG. 15) with the module gripper 430 (see FIG. 3) and provide power to the holding module 330 so as to separate the gas container 50 from the holding module 330.

In some embodiments, when the valve manipulation module 320 (see FIG. 18) is fastened to the gas container 50, the superordinate system may command the fastening vehicle 400 to grip the valve manipulation module 320 and separate the valve manipulation module 320 from the gas container 50.

Specifically, the fastening vehicle 400 may move to the gas supply cabinet 300 loaded with the gas container 50 in which the gas has been used up (consumed). The fastening vehicle 400 moving to the gas supply cabinet 300 grips the valve manipulation module 320 (see FIG. 18) fastened to the gas container 50, and may then switch the valve structure 51 of the gas container 50 to a closed position using the valve manipulation module 320, separate the valve manipulation module 320 from the gas container 50, and mount the valve manipulation module 320 on a second holder 392. For example, the module gripper 430 (see FIG. 3) of the fastening vehicle 400 may provide power to an operating lever 325 (see FIG. 18) of the valve manipulation module 320 and rotate the valve structure 51 to switch the valve structure 51 to the closed position. However, embodiments are not limited thereto, and the module gripper 430 of the fastening vehicle 400 may directly rotate or move the valve structure 51 to switch the valve structure 51 to the closed position.

Next, the fastening vehicle 400 grips the holding module 330 fastened to the gas container 50, and may then separate the valve nozzle 53 of the gas container 50 from the gas nozzle 3313 and mount the holding module 330 on a first holder 391. Specifically, the fastening vehicle 400 may grip the holding module 330 and provide power to a connector holder 331 (see FIG. 15). The connector holder 331 may be a threaded connector configured to be threaded with a threaded connector of the valve nozzle 53 or otherwise secured to the valve nozzle 53. The connector holder 331 may have a standard connector size as specified by the CGA. Similarly, the valve nozzle 53 may have a standard connector as specified by the CGA. The module gripper 430 (see FIG. 3) of the fastening vehicle 400 may provide power to the connector holder 331 and rotate the connector holder 331 to separate the valve nozzle 53 from the gas nozzle 3313.

Next, the transport vehicle may unload the gas container 50 in which gas has been used up (e.g., consumed) from the gas supply cabinet 300 and load the gas container 50 filled with gas into the gas supply cabinet 300. In some embodiments, the fastening vehicle 400 may mount the holding module 330 on a first holder 391 (see FIG. 17) and fasten the connector holder 331 to a plug 3911, which may occur while the transport vehicle is unloading/loading the gas container 50. The plug 3911 may obstruct gas from flowing through the connector holder 331 to prevent gas from escaping or ambient air from flowing into the gas pipe connected to the connector holder 331.

Next, the fastening vehicle 400 may fasten the holding module 330 to the gas container 50. Specifically, the fastening vehicle 400 grips the holding module 330 mounted on the first holder 391, and may then move the holding module 330 to the gas container 50, fasten the gas container 50 to the holding module 330 via the connector holder 331, and release the holding module 330. For example, when the gas container 50 is fastened to the holding module 330, the module gripper 430 (see FIG. 3) of the fastening vehicle 400 provides power to the connector holder 331 (see FIG. 15). Accordingly, the connector holder 331 is rotated, and the gas container 50 may be fastened to the holding module 330.

Next, in embodiments that include the valve manipulation module 320, the fastening vehicle 400 grips the valve manipulation module 320 mounted on a second holder 392. The fastening vehicle may then move the valve manipulation module 320 to the gas container 50 and switch the valve structure 51 of the gas container 50 to an open position using the valve manipulation module 320. For example, the module gripper 430 (see FIG. 3) of the fastening vehicle 400 may provide power to an operating lever 325 (see FIG. 18) of the valve manipulation module 320 and rotate the valve structure 51 to switch the valve structure 51 to the open position. However, embodiments are not limited thereto, and the module gripper 430 of the fastening vehicle 400 may directly switch the valve structure 51 of the gas container 50 to the open position without using a separate valve manipulation module 320.

Figure 22:
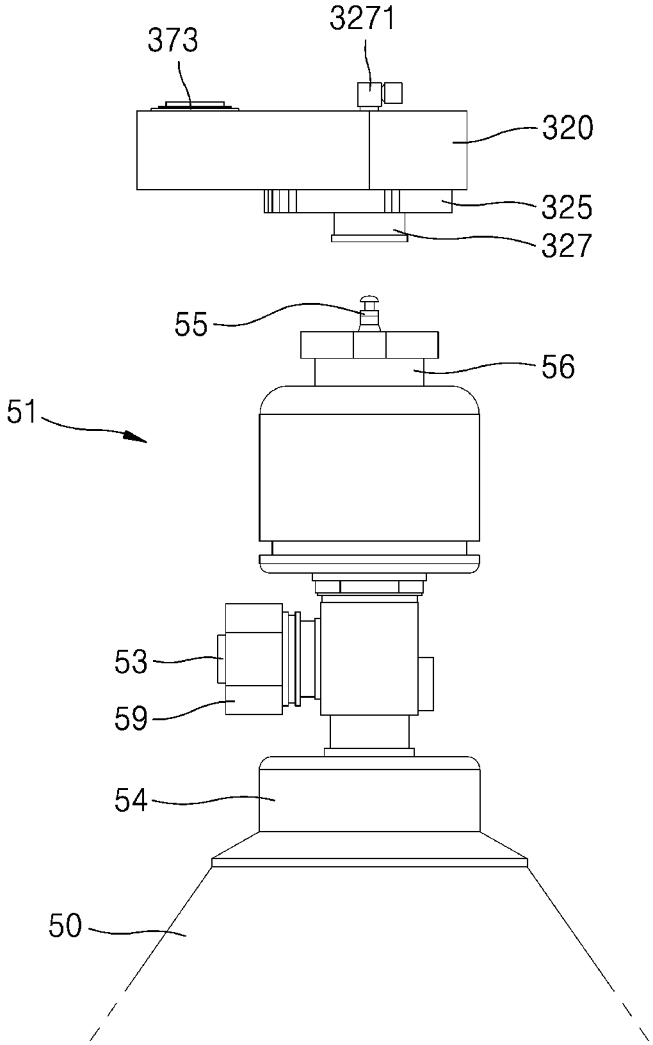

In some embodiments, the valve structure 51 (see FIG. 22) may further include a locking handle 56 (see FIG. 22). The locking handle 56 may switch between an unlocked position and a locked position. In the unlocked position, the valve structure 51 is able to switch between an open position and a closed position. In the locked position, the valve structure 51 is fixed to the closed position. The module gripper 430 (see FIG. 3) of the fastening vehicle 400 may provide power to the operating lever 325 of the valve manipulation module 320 (see FIG. 22) and rotate the locking handle 56 of the valve structure 51 to switch the locking handle 56 to the unlocked position. After the locking handle 56 is switched to the unlocked position, the valve manipulation module 320 may apply pneumatic pressure to the valve structure 51 via a pneumatic connector 327 (see FIG. 22) to switch the valve structure 51 to the open position.

Figure 4:
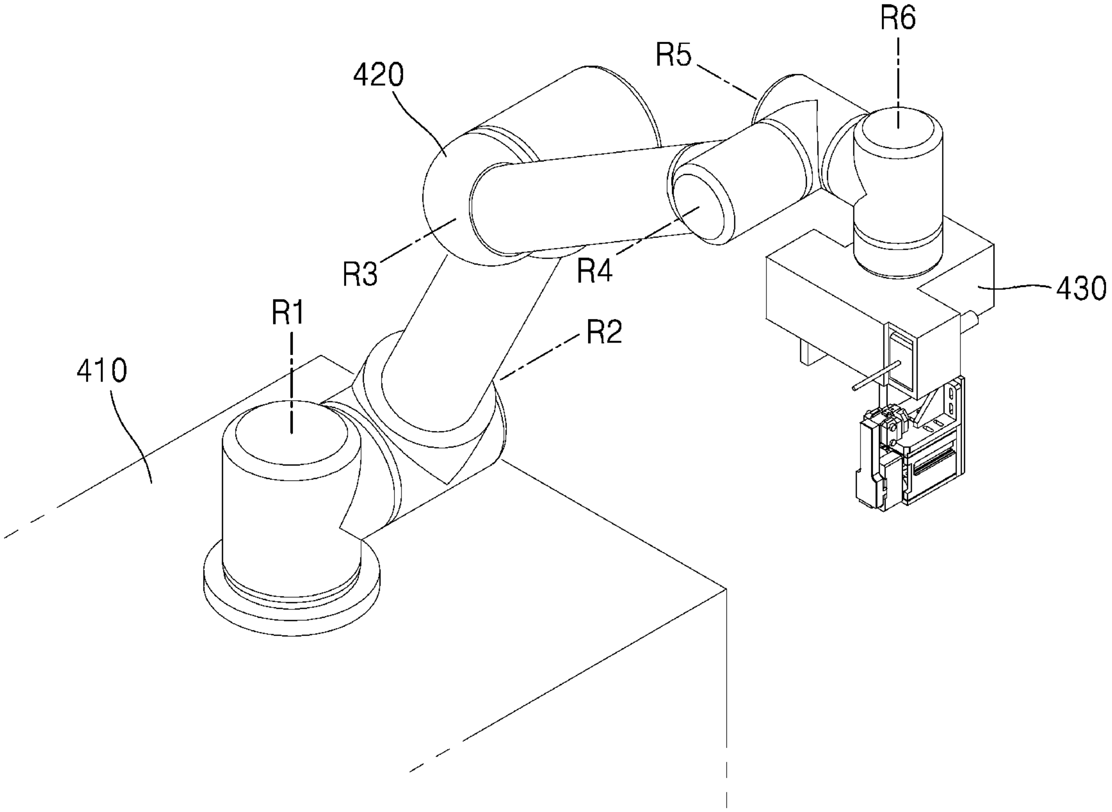
Figure 5:
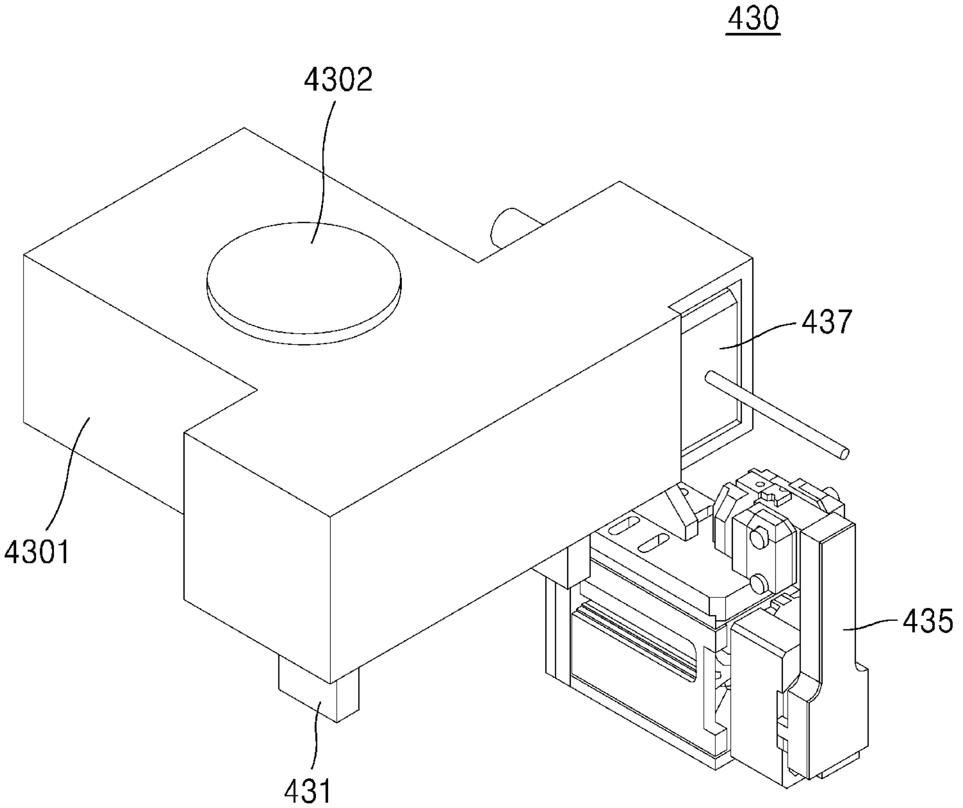
FIGS. 5 and 6 are perspective views schematically illustrating a module gripper of FIG. 1 according to some embodiments.
Figure 6:
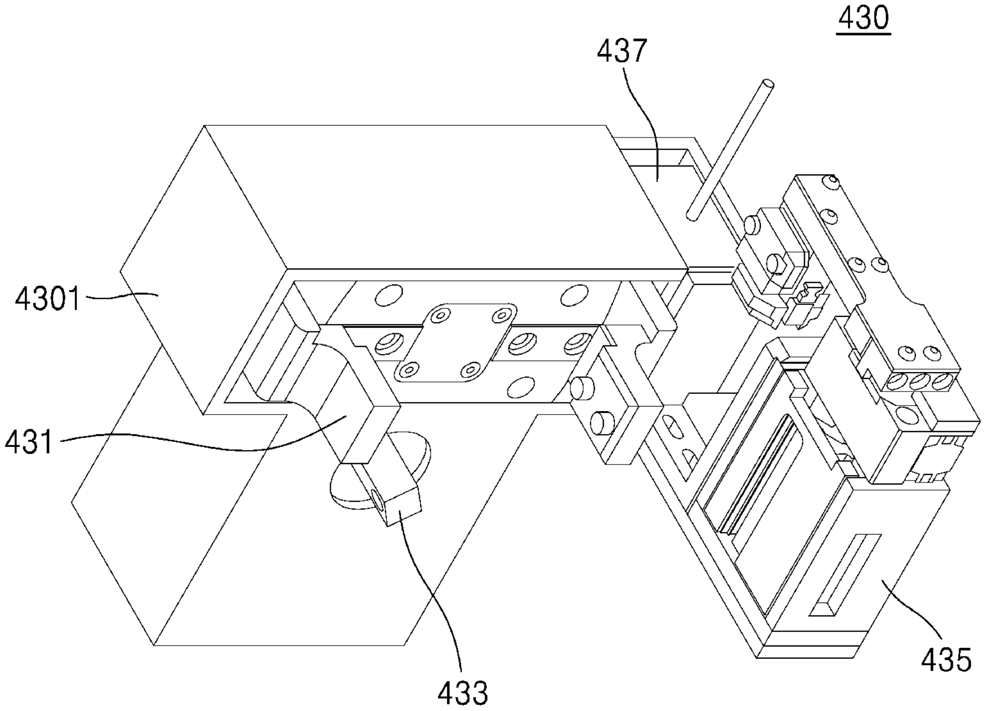
Figure 7:
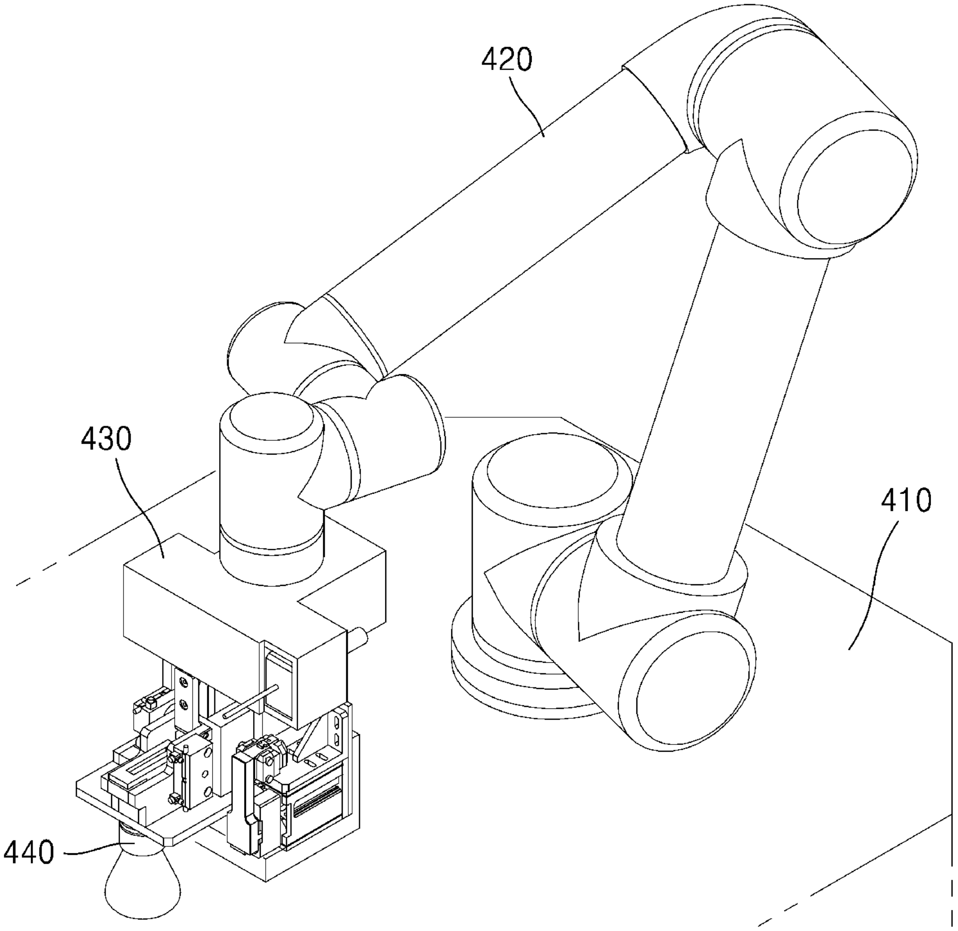
FIG. 7 is a perspective view schematically illustrating a portion of the fastening vehicle of FIG. 1 according to some embodiments.
Figure 8:
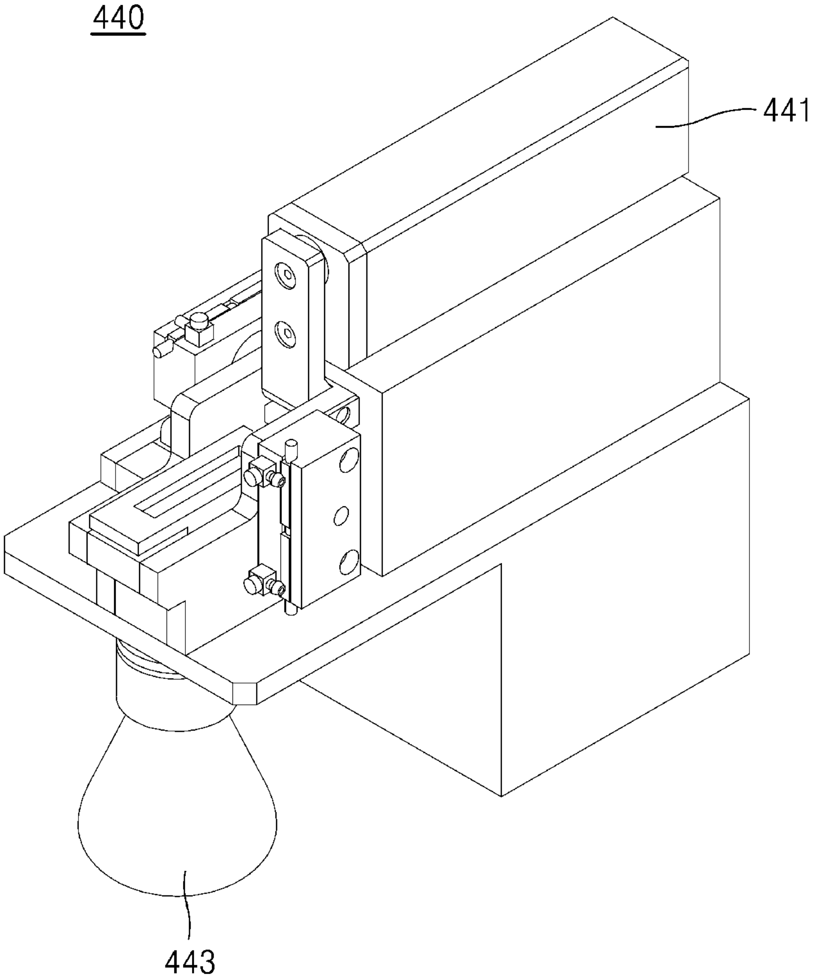
FIG. 8 is a perspective view schematically illustrating a gasket feeder of FIG. 1 according to some embodiments.

FIGS. 3 and 4 are perspective views schematically illustrating the fastening vehicle 400 of FIG. 1. FIGS. 5 and 6 are perspective views schematically illustrating a module gripper 430 of FIG. 3. FIG. 7 is a perspective view schematically illustrating a portion of the fastening vehicle 400 of FIG. 1. FIG. 8 is a perspective view schematically illustrating a gasket feeder 440 of FIG. 7.

Referring to FIGS. 3 to 8, the fastening vehicle 400 is described in detail. The fastening vehicle 400 may include the traveling unit 410, the first multi-axis robot 420, the module gripper 430, and the gasket feeder 440.

A driving wheel connected to a driving motor may be provided on the bottom of the traveling unit 410. The first multi-axis robot 420 and the gasket feeder 440 may be attached to the traveling unit 410. The traveling unit 410 may move between the plurality of gas supply cabinets 300 (see FIG. 2) with the first multi-axis robot 420 and the gasket feeder 440 attached thereto. The first multi-axis robot 420 and the gasket feeder 440 may be located outside (e.g., external to) the gas supply cabinet 300 and may move together with the traveling unit 410 in a facility space.

The first multi-axis robot 420 may have a first end fixed to the traveling unit 410 and include a plurality of arms that are rotatable about a plurality of rotation axes R1 to R6 and that are connected to each other in series. The module gripper 430 for gripping the holding module 330 (see FIG. 15) or the valve manipulation module 320 (see FIG. 18) may be mounted on a second end (e.g., a far end opposite the first end) of the first multi-axis robot 420.

For example, the first multi-axis robot 420 may include a 6-axis robot having six rotation axes R1 to R6 and may move a module gripped by the module gripper 430 to an arbitrary position and in an arbitrary direction within a motion range of a plurality of arms. In addition, the operations of the first multi-axis robot 420 and the module gripper 430 may be defined in a predetermined sequence and stored in a controller or memory in advance, and thus, it is possible to fully automate the operation of fastening a module gripped by the module gripper 430 to or separating the module from the gas container 50 (see FIG. 2).

The module gripper 430 may include a clamping mechanism 431, a power transmission shaft 433, a gasket gripper 435, and a vision sensor 437. The module gripper 430 may grip the holding module 330 (see FIG. 15) or the valve manipulation module 320 (see FIG. 18), insert the power transmission shaft 433 into the gripped module, and operate the gripped module.

The first multi-axis robot 420 may be coupled to a region 4302 located on one surface of a body 4301 of the module gripper 430, and the clamping mechanism 431 and the gasket gripper 435 may be located on an opposite surface of the body 4301 of the module gripper 430. The body 4301 of the module gripper 430 may be coupled to the first multi-axis robot 420, receive power for driving an actuator provided therein, and move according to the movement and rotation of the first multi-axis robot 420.

The clamping mechanism 431 may grip and hold the holding module 330 (see FIG. 15) or the valve manipulation module 320 (see FIG. 18). The clamping mechanism 431 may include a clamping arm for holding the holding module 330 or the valve manipulation module 320 and an actuator connected to the clamping arm. During loading/unloading of the gas container 50 or when starting the loading/unloading of the gas container 50, the first multi-axis robot 420 may move the holding module 330 or the valve manipulation module 320 gripped by the clamping mechanism 431 to an appropriate position.

In some embodiments, the module gripper 430 may include a distance sensor. The distance sensor may sense a distance between the module gripper 430 and one or more positions of a valve head 52 (see FIG. 13) of the gas container 50 and detect a tilt of the valve structure 51 (see FIG. 13) on the basis of the sensed distance between the module gripper 430 and one or more positions of the valve head 52.

The module gripper 430 transmits the detected tilt to a controller, such as a controller of the fastening vehicle 400, and the controller of the fastening vehicle 400 may rotate the first multi-axis robot 420 and adjust the tilt of the module gripper 430 and the tilt of the holding module 330 or the valve manipulation module 320 gripped by the module gripper 430.

Depending on the tilt of the bottom of the gas container 50 (see FIG. 2) or the tilt of the outer circumferential surface of the gas container 50, the valve structure 51 (see FIG. 13) may be inclined with respect to a reference position. When the position of an end cap 59 (see FIG. 13) is detected and/or the position of the valve nozzle 53 (see FIG. 13) is detected, the position of the holding module 330 or the valve manipulation module 320 is adjusted according to the detected tilt of the valve structure 51. Accordingly, the precision of the fastening operation between each of the connector holder 331 and the end cap holder 333 of the holding module 330 and the valve structure 51 may be improved.

The vision sensor 437 may detect the position of the holding module 330 (see FIG. 15) or the position of the valve manipulation module 320 (see FIG. 18). Before the module gripper 430 grips the holding module 330 with the clamping mechanism 431, a first vision mark 339 attached to the holding module 330 or a second vision mark 329 attached to the valve manipulation module 320 may be sensed using the vision sensor 437. Accordingly, it is possible to detect the position of the holding module 330 or the position of the valve manipulation module 320 using the vision sensor 437.

The power transmission shaft 433 may be detachably inserted into the holding module 330 (see FIG. 15) or the valve manipulation module 320 (see FIG. 18). The power transmission shaft 433 may transmit power generated by an actuator inside the module gripper 430 to the holding module 330 or the valve manipulation module 320.

Figure 15:
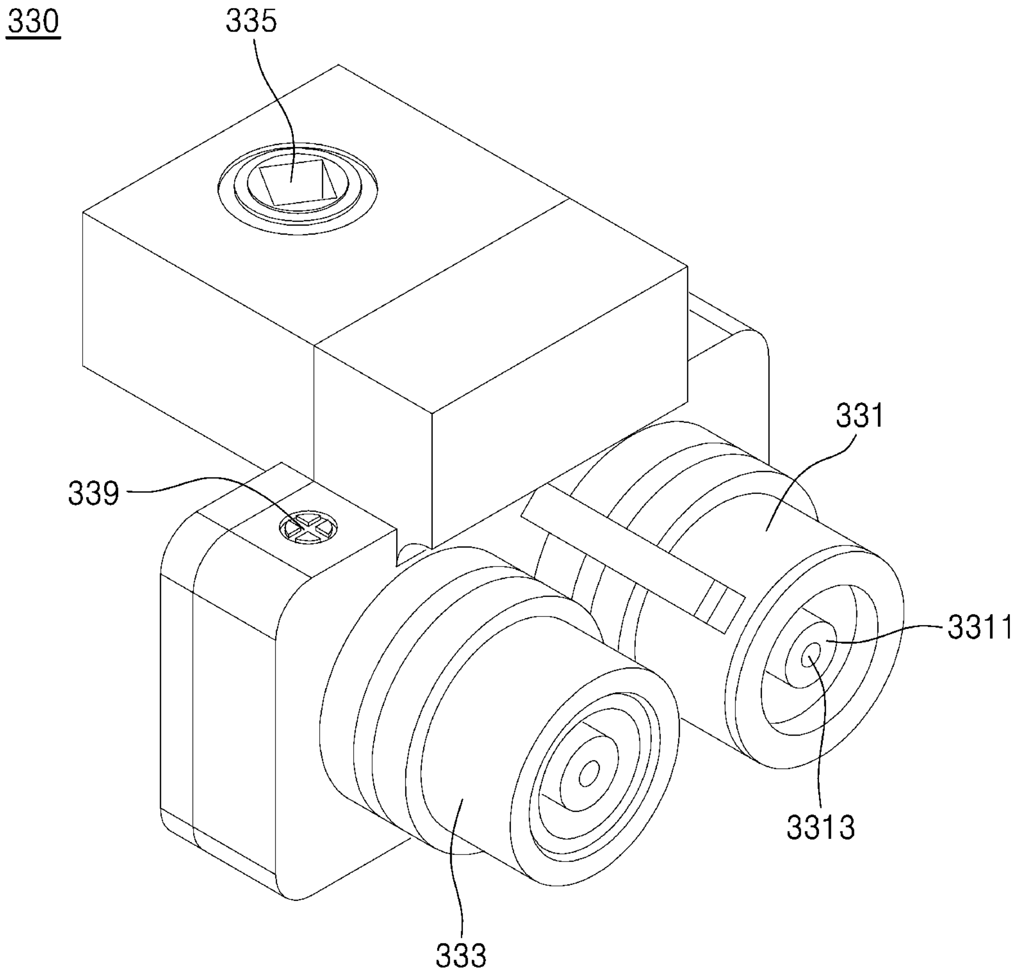
FIG. 15 is a perspective view schematically illustrating a compressed gas association (CGA) holding module according to some embodiments.

The gasket gripper 435 may insert a gasket into or remove a gasket from the gas nozzle 3313 (see FIG. 15). The gasket gripper 435 may be configured to be moved by an actuator and grip the gasket. When the clamping mechanism 431 of the module gripper 430 grips the holding module 330 (see FIG. 15), the gasket gripper 435 may insert the gasket into an end of the gas nozzle 3313 of the connector holder 331 (see FIG. 15). In addition, when the clamping mechanism 431 of the module gripper 430 grips the holding module 330, the gasket gripper 435 may separate the gasket inserted into the end of the gas nozzle 3313 of the connector holder 331 from the gas nozzle 3313.

The gasket gripper 435 may be configured to be moved by a pneumatic actuator. In this case, during a process in which the gasket gripper 435 is docked to the gas nozzle 3313 for inserting the gasket, a force that continuously pushes the gas nozzle 3313 due to the operation of the pneumatic actuator is applied to the gasket gripper 435.

In some embodiments, a force acting on the gasket gripper 435 causes friction between a finger of the gasket gripper 435 and the gas nozzle 3313, and thus, the finger of the gasket gripper 435 may not switch from a full-grip orientation to an un-grip orientation. In order to prevent a limitation in which the finger of the gasket gripper 435 cannot switch from the full-grip orientation to the un-grip orientation, an exhaust-type solenoid valve may relieve pressure from the pneumatic actuator for driving the gasket gripper 435.

When the gasket gripper 435 places the gasket at a gasket insertion position of the gas nozzle 3313, the exhaust-type solenoid valve switches to an exhaust state, thereby reducing the force of the gasket gripper 435 that pushes the gas nozzle 3313. When the force of the gasket gripper 435 pushing the gas nozzle 3313 is reduced, the finger of the gasket gripper 435 may easily switch from the full-grip orientation to the un-grip orientation.

The gasket feeder 440 may supply new gaskets to the gasket gripper 435 of the module gripper 430 and store used waste gaskets. The gasket feeder 440 is attached to the traveling unit 410 and may move together with the traveling unit 410.

The module gripper 430 may be moved, by the rotation of the first multi-axis robot 420, to a position at which the module gripper 430 interfaces with the gasket feeder 440. The gasket feeder 440 may include a gasket loading box 441 and a gasket disposal box 443. The gasket loading box 441 may store one or more gaskets and supply the gaskets to the gasket gripper 435. The gasket loading box 441 may be detachably mounted at a mounting position of the gasket feeder 440. An operator or a robot may detach the gasket loading box 441 in which the gaskets have been used up from the mounting position of the gasket feeder 440 and mount a new gasket loading box 441 in which new gaskets are stored to the mounting position of the gasket feeder 440.

The gasket loading box 441 may include an elastic body or an actuator that moves the stored gasket to a supply position. When the gasket gripper 435 of the module gripper 430 interfaces with the gasket feeder 440, the gasket gripper 435 may grip a gasket at the supply position of the gasket loading box 441. The gasket feeder 440 may include a sensor that checks the number of remaining gaskets in the gasket loading box 441 and generates an alarm when all of the gaskets have been used up. In addition, the gasket disposal box 443 may store waste gaskets. The waste gaskets stored in the gasket disposal box 443 may be discarded at once by the operator or robot.

Figure 9:
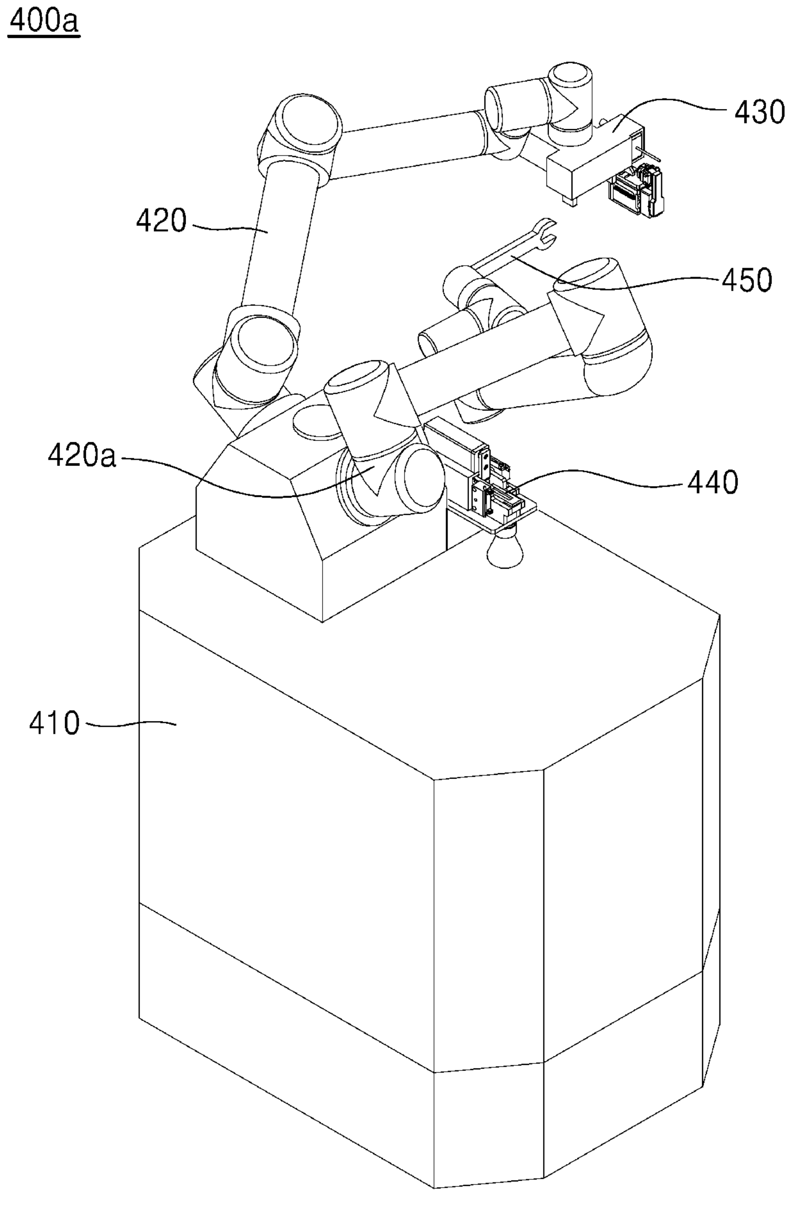
FIGS. 9 and 10 are perspective views schematically illustrating a fastening vehicle according to some embodiments.
Figure 10:
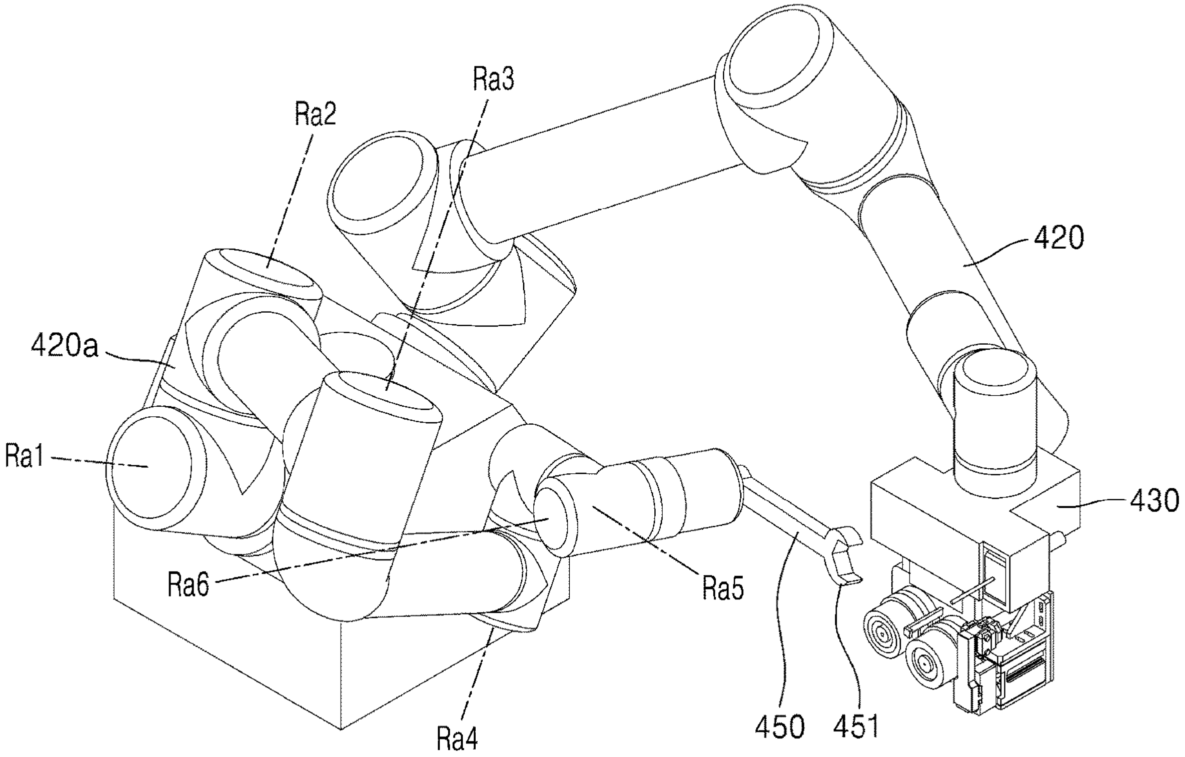
Figure 11:
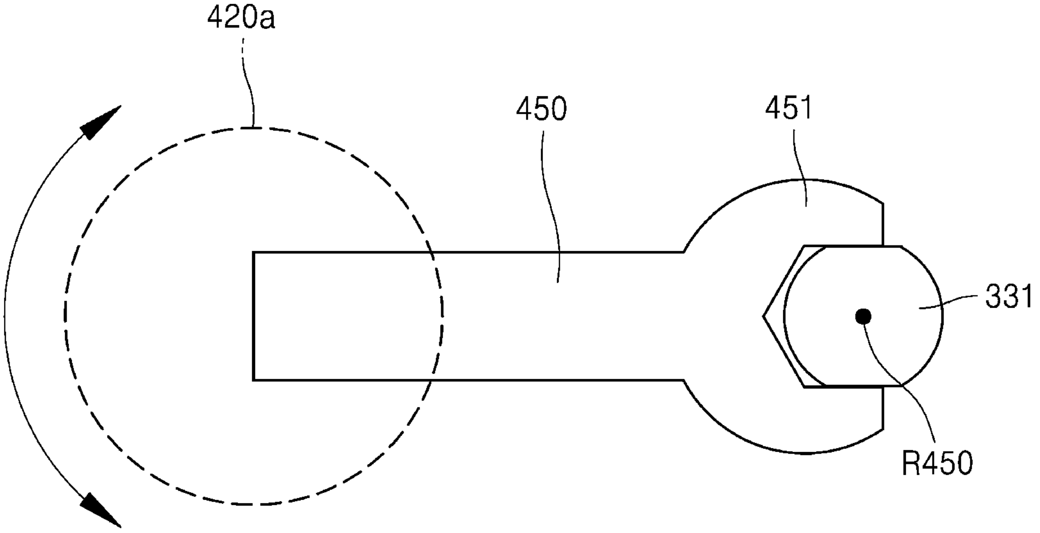
FIG. 11 is a perspective view schematically illustrating a state in which a fastening module of FIG. 9 engages with a connector holder according to some embodiments.

FIGS. 9 and 10 are perspective views schematically illustrating a fastening vehicle **400*a* according to some embodiments. FIG. 11 is a perspective view schematically illustrating a state in which a fastening module 450 of FIG. 9 engages with a connector holder 331**.

Referring to FIGS. 9 to 11, the fastening vehicle **400*a* may include a traveling unit 410, a plurality of multi-axis robots, a module gripper 430, and a gasket feeder 440**.

Hereinafter, repeated descriptions between the fastening vehicle **400*a* of FIG. 9 and the fastening vehicle 400 of FIG. 3** may be omitted and differences thereof may be described in further detail.

Each of the plurality of multi-axis robots may be fixed to the traveling unit 410 at a first end of each of the plurality of multi-axis robots. FIG. 9 illustrates that the fastening vehicle **400*a* includes two multi-axis robots, but embodiments are not limited thereto. The fastening vehicle 400*a*** may include three or more multi-axis robots.

In some embodiments, the plurality of multi-axis robots may include a first multi-axis robot 420 and a second multi-axis robot **420*a*. The first multi-axis robot 420 and the second multi-axis robot 420*a* may rotate independently of each other. That is, the movement of the first multi-axis robot 420 may be independent of the movement of the second multi-axis robot 420*a***.

For example, a region in which the first end of the first multi-axis robot 420 is attached to the traveling unit 410 and a region in which the second end of the second multi-axis robot **420*a* is attached to the traveling unit 410 may be adjacent to each other, and thus, the first multi-axis robot 420 and the second multi-axis robot 420*a* may be disposed on the traveling unit 410 to form a "V" shape. In addition, in some embodiments, the region to which the first end of the first multi-axis robot 420 is attached and the region to which the second end of the second multi-axis robot 420*a* is attached may be spaced apart from each other with the gasket feeder 440** therebetween.

The first multi-axis robot 420 may include a plurality of arms that are rotatable about a plurality of rotation axes R1 to R6 and connected to each other. The module gripper 430 for gripping the holding module 330 (see FIG. 15) or the valve manipulation module 320 (see FIG. 18) may be mounted on a second end (e.g., a far end opposite to the first end) of the first multi-axis robot 420.

The second multi-axis robot **420*a* may include a plurality of arms that are rotatable about a plurality of rotation axes Ra1 to Ra6 and connected to each other in series. A second end (e.g., a far end opposite to the first end) of the second multi-axis robot 420*a* may be equipped with a fastening module 450 for applying external force to the holding module 330 when the connector holder 331 of the holding module 330 is fastened to or separated from the valve nozzle 53 (see FIG. 13). That is, the fastening module 450 may apply a high torque to the connector holder 331 when the connector holder 331 of the holding module 330 is fastened or separated. Preferably, the fastening module 450 may apply a torque of about 60 newton meters (Nm) to about 150 Nm to the connector holder 331**.

A first end of the fastening module 450 may be fixed to the second multi-axis robot **420*a* and a second end (e.g., a far end opposite the first end) of the fastening module 450 may include a pressing unit 451. That is, the pressing unit 451 and the second multi-axis robot 420*a* may be spaced apart from each other. As the distance between the pressing unit 451 and the second multi-axis robot 420*a* increases, the magnitude of torque applied to the connector holder 331 by the fastening module 450** may increase.

The pressing unit 451 of the fastening module 450 may engage with the connector holder 331. For example, the connector holder 331 may include a nut mechanism 3311 (see FIG. 15), and a portion of an inner wall of the pressing unit 451 may have a shape that engages with the nut mechanism of the connector holder 331. In some embodiments, the pressing unit 451 of the fastening module 450 may have a spanner shape and the outer wall of the nut mechanism may have a hexagonal prism shape.

The fastening module 450 may be moved by the second multi-axis robot **420*a* and engages with the connector holder 331. When the fastening module 450 engages with the connector holder 331, the fastening module 450 may rotate clockwise or counterclockwise about a center R450 (see FIG. 11) of the connector holder 331 as a portion of the second multi-axis robot 420*a* rotates about the rotation axis. That is, the fastening module 450 is rotated about the center R450 of the connector holder 331 by the movement of the second multi-axis robot 420*a*, and thus, the pressing unit 451 of the fastening module 450 may engage with the nut mechanism of the connector holder 331 and apply an external force to the connector holder 331**.

Figure 13:
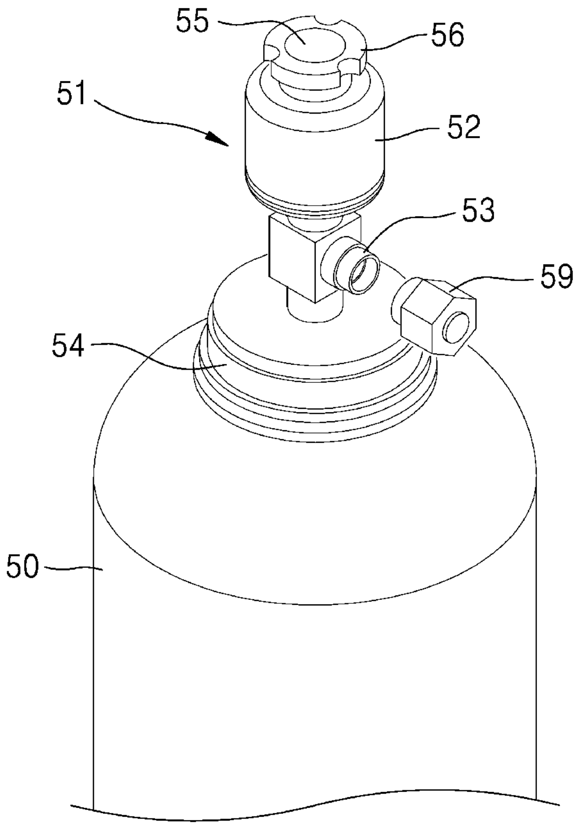
FIGS. 13 and 14 are perspective views showing a gas container according to some embodiments.

For example, depending on the rotation direction of the fastening module 450, the connector holder 331 may be fastened to or separated from the valve nozzle 53 (see FIG. 13). In order to prevent leakage of the high-pressure gas from the gas container 50 (see FIG. 2), high torque may need to be applied to the connector holder 331 to fasten the connector holder 331 to the valve nozzle 53 (see FIG. 13). The fastening module 450 may be offset a distance between the connector holder 331 and the second multi-axis robot **420*a* and relatively easily provide high torque to the connector holder 331**.

Figure 12:
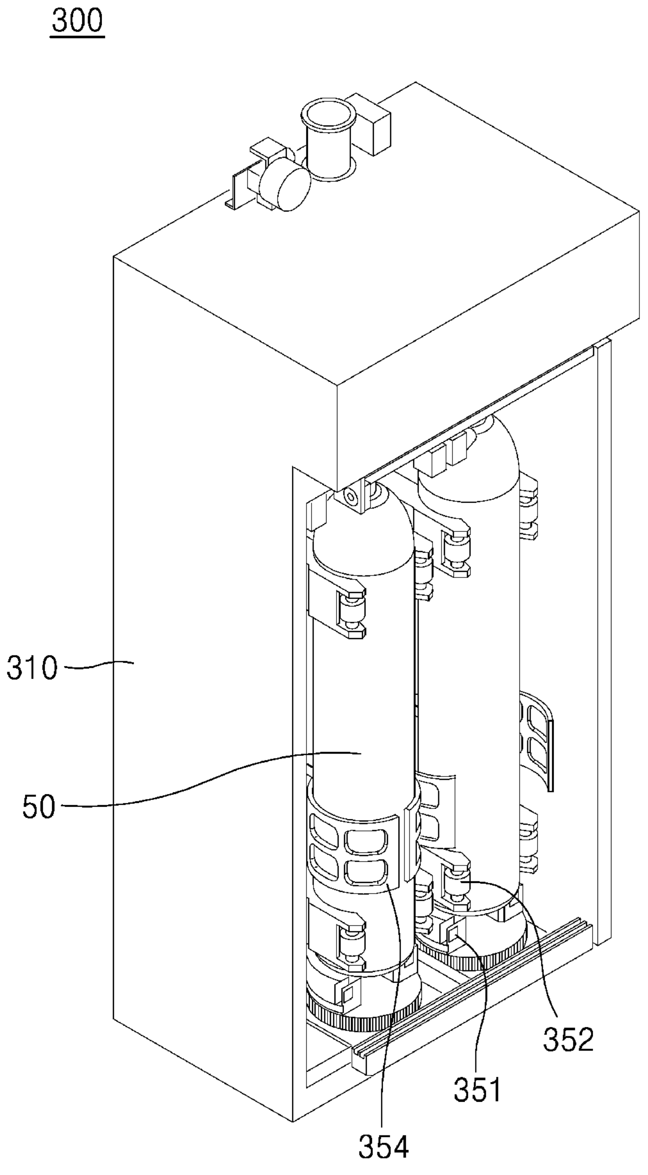
FIG. 12 is a perspective view schematically illustrating the gas supply cabinet of FIG. 1 according to some embodiments.
Figure 14:
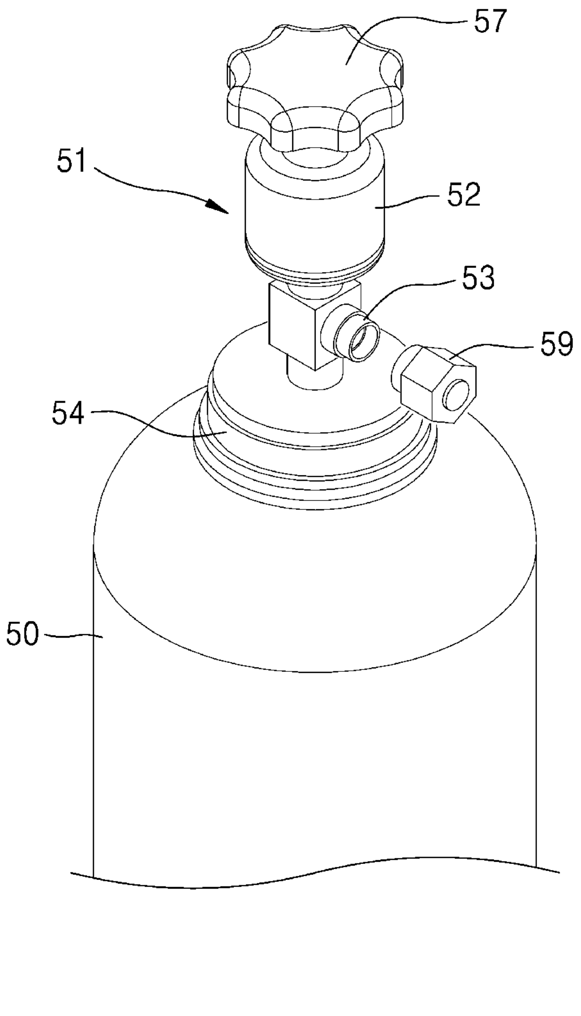

FIG. 12 is a perspective view schematically illustrating the gas supply cabinet 300 of FIG. 1. FIGS. 13 and 14 are perspective views showing a gas container 50 according to embodiments.

Referring to FIGS. 12 to 14 together with FIGS. 2 and 3, the gas supply cabinet 300 may include a cabinet frame 310, a container support module, a holding module 330, a first holder 391, and a second holder 392. In some embodiments, the gas supply cabinet 300 may include a valve manipulation module 320.

The cabinet frame 310 may provide an inner space in which one or more gas containers 50 are accommodated. For example, the cabinet frame 310 may provide a plurality of ports (e.g., spaces for housing gas containers 50), and the gas containers 50 may be respectively loaded into the plurality of ports. The plurality of gas containers 50 may be arranged in columns within the cabinet frame 310.

The cabinet frame 310 may include one or more doors 311 (see FIG. 2) that operate to automatically open and close the cabinet frame to selectively provide access to the inner space. The one or more doors 311 may be installed on the front of the cabinet frame 310. The one or more doors 311 may be driven by an actuator.

For example, the cabinet frame 310 may include a plurality of sliding doors, and one of the plurality of ports of the cabinet frame 310 may be accessed by moving an appropriate sliding door of the plurality of sliding doors. When the gas container 50 is moved in or out, a sliding door providing access to the corresponding port may be automatically opened or closed.

The container support module may include a base plate 351 and a gripper 352.

The base plate 351 may support the bottom of the gas container 50. The base plate 351 may be disposed on the bottom of the cabinet frame 310 and the gas container 50 may be placed on the upper surface of the base plate 351. The base plate 351 may support lateral sides of the bottom of the gas container 50. A weight sensor, such as a load cell, may be provided in the base plate 351. The weight sensor is configured to measure the weight of the gas container 50 and may detect the amount of gas remaining in the gas container 50 on the basis of the weight of the gas container 50 obtained by the weight sensor.

The gripper 352 may grip the gas container 50 accommodated in the cabinet frame 310 to prevent the gas container 50 from falling over. The container support module may include one or more grippers 352. For example, the container support module may include a gripper 352 for gripping a lower portion of a side surface of the gas container 50 and a gripper 352 for gripping an upper portion of the side surface of the gas container 50.

The gripper 352 may include a pair of gripping arms and gripping rollers. The gripping arms may be moved while connected to an actuator, such as an air cylinder. The gripping rollers may be respectively and rotatably installed to the gripping arms. The gripping rollers may be in contact with and support the gas container 50. When the gas container 50 is gripped using the gripper 352, the gripping rollers may come into close contact with the outer surface of the gas container 50 and stably grip the gas container 50.

In some embodiments, the container support module may further include a temperature regulating mechanism 354. In some embodiments, the temperature regulating mechanism 354 may include a heating jacket mechanism or a cooling jacket mechanism.

The heating jacket mechanism may cover at least a portion of the outer surface of the gas container 50. The heating jacket mechanism may be configured to heat the gas container 50. The heating jacket mechanism may selectively heat the gas container 50 to vaporize a liquefied gas in the gas container 50.

The cooling jacket mechanism may cover at least a portion of the gas container 50. The cooling jacket mechanism may cool the gas container 50 so that the temperature of the gas filling the inside of the gas container 50 is maintained within a predetermined target temperature range. In particular, when the gas container 50 is filled with flammable gas, the cooling jacket mechanism may cool the gas container 50 to a predetermined temperature or less to thereby prevent an explosion.

The gas container 50 may be provided with a valve structure 51 for controlling discharge of gas contained in the gas container 50. The valve structure 51 of the gas container 50 may include a pneumatic valve (or an air actuated valve). In addition, the valve structure 51 of the gas container 50 may include a simple on/off valve (e.g., a ball valve).

Hereinafter, an open position or open state of the valve structure 51 may refer to a position or state when a gas flow path in the valve structure 51 is opened and thus gas is allowed to be discharged via a valve nozzle 53. Also, a closed position or closed state of the valve structure 51 is defined as a position or state when the gas flow path in the valve structure 51 is closed and thus gas is not allowed to be discharged via the valve nozzle 53.

In some embodiments, when the valve structure 51 includes a pneumatic valve, the valve structure 51 may be configured to pneumatically control operation of a diaphragm that is configured to open and close the gas flow path inside the valve structure 51. For example, the diaphragm is configured to be lifted and lowered by air pressure, and the gas flow path in the valve structure 51 may be opened and closed by lifting and lowering the diaphragm.

In some embodiments, when the valve structure 51 includes a simple on/off valve, the valve structure 51 may be configured to manually control rotation of a structure (e.g., a ball) that is configured to open and close the gas flow path inside the valve structure 51. For example, when the structure includes a ball, a through-hole passing through a portion of the ball may communicate with or separate from the gas flow path according to the rotation of the ball. That is, the gas flow path in the valve structure 51 may be opened and closed by the rotation of the ball.

The valve structure 51 may include a valve head 52 and an end cap 59.

An alignment structure may be provided in the valve head 52. The alignment structure may include a strip, a groove, or a specific structure that is provided on the outer circumferential surface of the valve head 52. The alignment structure of the valve head 52 may be sensed by a vision sensor of an external device. The vision sensor may include a camera, an image sensor, and the like. On the basis of the information obtained by sensing the alignment structure of the valve head 52 with the vision sensor, the position and orientation of the valve structure 51 may be detected, and the external device and the valve structure 51 may be aligned with each other. The alignment structure may be sensed by another sensor other than the vision sensor. In addition, a QR code relating to information about the gas container 50 (e.g., material properties of gas) may be attached to the valve head 52.

The end cap 59 may open and close an outlet of the valve nozzle 53. The end cap 59 may be detachably fastened to the valve nozzle 53. The end cap 59 may be screw-coupled to the valve nozzle 53.

In some embodiments, when the valve structure 51 includes a pneumatic valve, the valve structure 51 may include a pneumatic connector 55 and a locking handle 56 as illustrated in FIG. 13.

The pneumatic connector 55 may be provided above an upper end of the valve head 52. The pneumatic connector 55 may be connected to a pneumatic line inside the valve structure 51 and include a flow path for transmitting air pressure, supplied from an external compressed air source, to the pneumatic line inside the valve structure 51. For example, the air pressure supplied from the outside may act on the diaphragm of the valve structure 51 via the pneumatic connector 55 and the pneumatic line inside the valve structure 51. When the air pressure supplied from the outside acts on the diaphragm via the pneumatic connector 55, the diaphragm closes the gas flow path in the valve structure 51, thereby bringing the valve structure 51 into a closed state.

The locking handle 56 may selectively restrict the operation of the valve structure 51. The locking handle 56 is disposed on the upper end of the valve head 52, and the locking handle 56 is rotatably installed on the valve head 52. The operation of the diaphragm may be permitted or restricted by the rotation of the locking handle 56. For example, the locking handle 56 may rotate between an unlocked position at which the diaphragm is allowed to ascend or descend and a locked position at which the diaphragm is not allowed to ascend or descend. When the locking handle 56 is in the unlocked position at which the diaphragm is allowed to ascend or descend, the position of the diaphragm may be determined by the air pressure supplied from the outside. When the locking handle 56 is in the locked position at which the diaphragm is not allowed to ascend or descend, the diaphragm may be pressed against the locking handle 56 to close the gas flow path in the valve structure 51. The valve structure 51 is in the closed position while the locking handle 56 is in the locked position, and thus, the gas is not allowed to be discharged via the valve structure 51. Thus, while gas container 50 is conveyed, the locking handle 56 is in the locked position. Accordingly, it is possible to prevent gas leakage due to damage to the diaphragm itself and/or damage to an elastic body that supports the diaphragm caused by vibration generated during transport of the gas container 50.

In some embodiments, when the valve structure 51 includes a simple on/off valve, the valve structure 51 may include a valve handle 57 as illustrated in FIG. 14. The simple on/off valve may open and close the gas flow path by means of rotation of a disk-shaped or ball-shaped structure installed on the gas flow path.

The valve handle 57 may be located above the upper end of the valve head 52. The valve handle 57 may be rotatably installed in the valve head 52. The gas flow path of the valve structure 51 may be opened and closed by rotation of the valve handle 57 due to an external force.

In some embodiments, the gas flow path may be opened or closed by rotation of a ball located in the gas flow path. The valve handle 57 is connected to the ball, and thus, the ball may be rotated by rotation of the valve handle 57. Specifically, a through-hole passing through the ball may be adjusted to communicate with or separate from the gas flow path by rotation of the valve handle 57. That is, when the gas flow path and the through-hole are connected to each other by rotation of the valve handle 57, a high-pressure gas inside the gas container 50 may be discharged. Also, when the gas flow path and the through-hole are disconnected from each other, the high-pressure gas inside the gas container 50 is not allowed to be discharged.

In some embodiments, the module gripper 430 may manipulate the valve handle 57. That is, the module gripper 430 may rotate the valve handle 57 to switch the valve structure 51 between the open position and the closed position. That is, the module gripper 430 may rotate the valve handle 57 without gripping a separate module.

Figure 16:
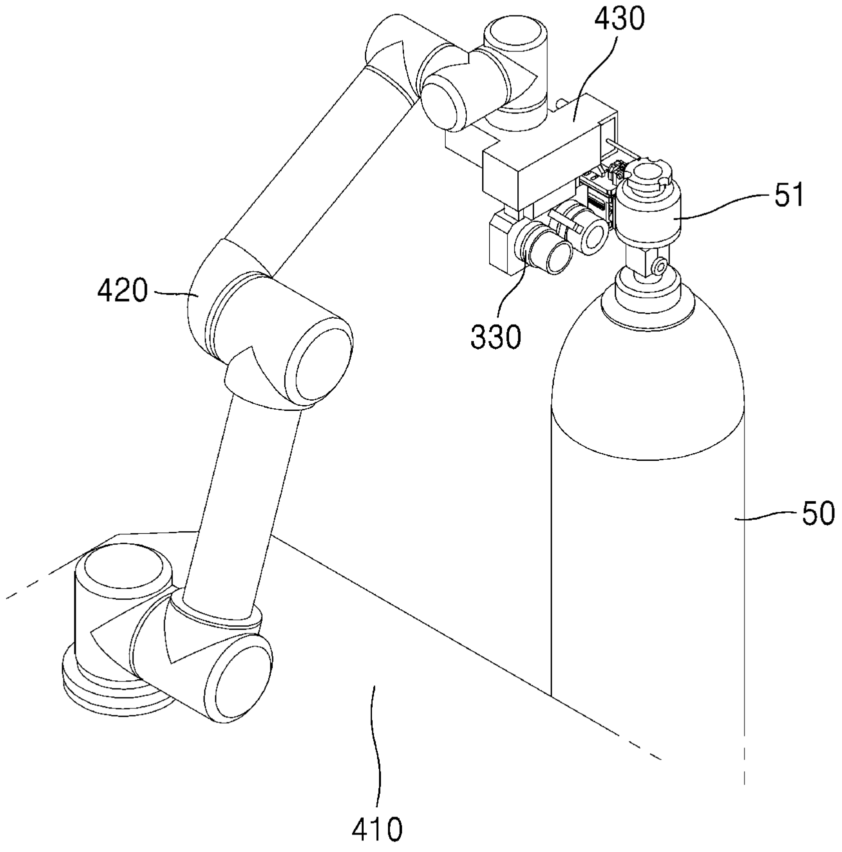
FIG. 16 is a perspective view schematically illustrating a state in which the fastening vehicle of FIG. 1 grips the holding module according to some embodiments.
Figure 17:
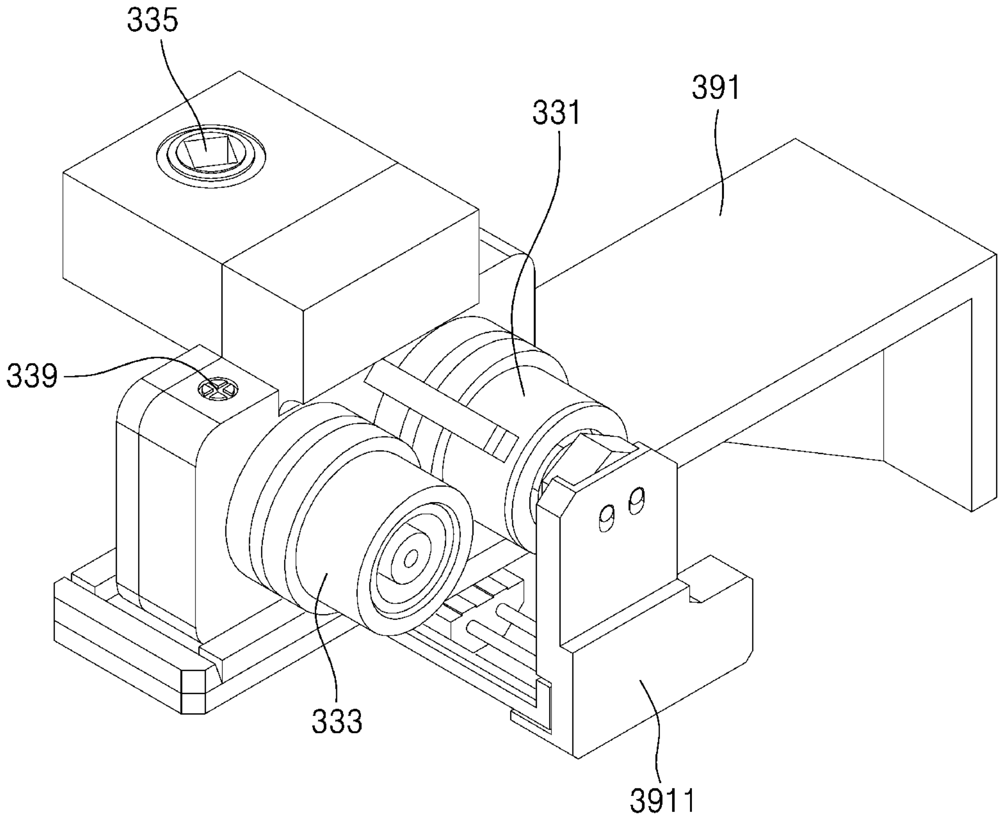
FIG. 17 is a perspective view schematically illustrating a state in which the holding module of FIG. 15 is mounted on a holder according to some embodiments.

FIG. 15 is a perspective view schematically illustrating a holding module 330 according to embodiments. FIG. 16 is a perspective view schematically illustrating a state in which the fastening vehicle 400 of FIG. 1 grips the holding module 330. FIG. 17 is a perspective view schematically illustrating a state in which the holding module 330 of FIG. 15 is mounted on a first holder 391.

Referring to FIGS. 15 to 17 together with FIGS. 1, 2, 6, 12, 13, and 14, the holding module 330 may include the connector holder 331, an end cap holder 333, a first insertion portion 335, and a first vision mark 339. One holding module 330 may be installed in each of the ports of the gas supply cabinet 300. The number of holding modules 330 may be equal to the number of gas containers 50 accommodated in the cabinet frame 310.

The holding modules 330 may be detachably mounted to a plug 3911 of a first holder 391 installed on an inner wall of the cabinet frame 310. The holding module 330 may be moved to an appropriate position by the fastening vehicle 400.

The connector holder 331 may include the gas nozzle 3313 that communicates with a flow path of the valve nozzle 53 of the valve structure 51. The gas nozzle 3313 has a flow path through which a gas flows and may be connected to a gas connection pipe outside (e.g., external to) the gas supply cabinet 300.

When the connector holder 331 is fastened to the valve nozzle 53 of the valve structure 51, the gas discharged through the valve nozzle 53 may be supplied, via the gas nozzle 3313 of the connector holder 331 and the gas connection pipe outside the gas supply cabinet 300, to the semiconductor manufacturing equipment in which the gas is consumed.

When the connector holder 331 is fastened to or separated from the valve structure 51, the valve nozzle 53 and the gas nozzle 3313 of the valve structure 51 may communicate with or be separated from each other, respectively. The nut mechanism 3311 may be fastened to and separated from the valve nozzle 53 and may be provided at an end of the connector holder 331. The nut mechanism 3311 may be rotated by power supplied from the outside (external to the holding module 330) and fastened to or separated from the valve nozzle 53 by the relative rotation of the nut mechanism (e.g., a threaded connection between the nut mechanism 3311 and the valve nozzle 53).

The nut mechanism 3311 may include the gas nozzle 3313. When the nut mechanism 3311 is fastened to the valve nozzle 53, the gas nozzle 3313 of the connector holder 331 may communicate with the outlet of the valve nozzle 53. The connector holder 331 may perform fastening and separating operations between the valve nozzle 53 of the valve structure 51 and the gas nozzle 3313 of the connector holder 331.

In order to fasten the valve nozzle 53 of the valve structure 51 to the gas nozzle 3313 of the connector holder 331, the connector holder 331 and the valve nozzle 53 are aligned with each other in a straight line. Then, the connector holder 331 is moved so that the connector holder 331 engages with the valve nozzle 53. Subsequently, the nut mechanism 3311 of the connector holder 331 is rotated in a fastening rotation direction so as to fasten the nut mechanism 3311 to the valve nozzle 53.

In order to separate the valve nozzle 53 of the valve structure 51 from the gas nozzle 3313 of the connector holder 331, the nut mechanism 3311 is rotated in the opposite direction to the fastening direction so as to separate the nut mechanism 3311 from the valve nozzle 53. Then, the connector holder 331 is moved away from the valve nozzle 53.

The connector holder 331 is designed to have a degree of freedom with respect to both a straight-line movement direction of the connector holder 331 to fasten the connector holder 331 to the valve nozzle 53 and a direction inclined to the straight-line movement direction, and thus, it is possible to correct positional misalignment between the connector holder 331 and the valve nozzle 53.

The end cap holder 333 may fasten the end cap 59 to the valve nozzle 53 and separate the end cap 59 from the valve nozzle 53. The operation of fastening the end cap 59 may include fastening the end cap 59 to the valve nozzle 53 so that the outlet of the valve nozzle 53 is closed. The operation of separating the end cap 59 may include separating the end cap 59 from the valve nozzle 53 by rotating the end cap 59 in the opposite direction to the fastening direction so that the outlet of the valve nozzle 53 is opened.

The first vision mark 339 may be sensed by the vision sensor 437 of the module gripper 430 of the fastening vehicle 400. Specifically, before gripping the holding module 330 with the clamping mechanism 431, the fastening vehicle 400 may sense the first vision mark 339 attached to the holding module 330 using the vision sensor 437, thereby detecting the position of the holding module 330.

The power transmission shaft 433 of the module gripper 430 may be inserted into the first insertion portion 335 of the holding module 330. The power supplied from an actuator provided in the module gripper 430 may be transmitted to the connector holder 331 and the end cap holder 333 of the holding module 330 via the power transmission shaft 433. When the holding module 330 is gripped by the clamping mechanism 431, the module gripper 430 inserts the power transmission shaft 433 into the first insertion portion 335. Accordingly, the power for operating the connector holder 331 and the end cap holder 333 of the holding module 330 may be transmitted to the holding module 330.

Figure 20:
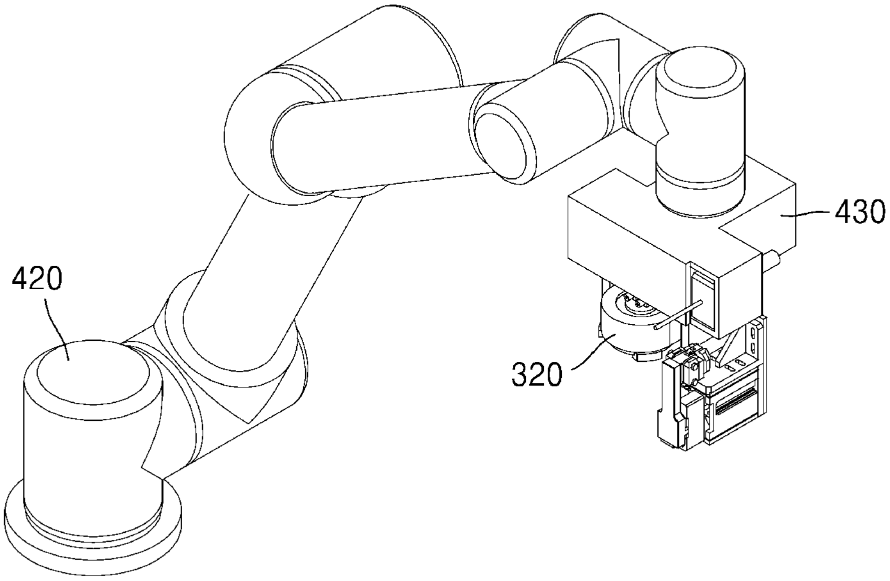
FIG. 20 is a perspective view schematically illustrating a state in which the fastening vehicle of FIG. 1 grips the valve manipulation module according to some embodiments.
Figure 21:
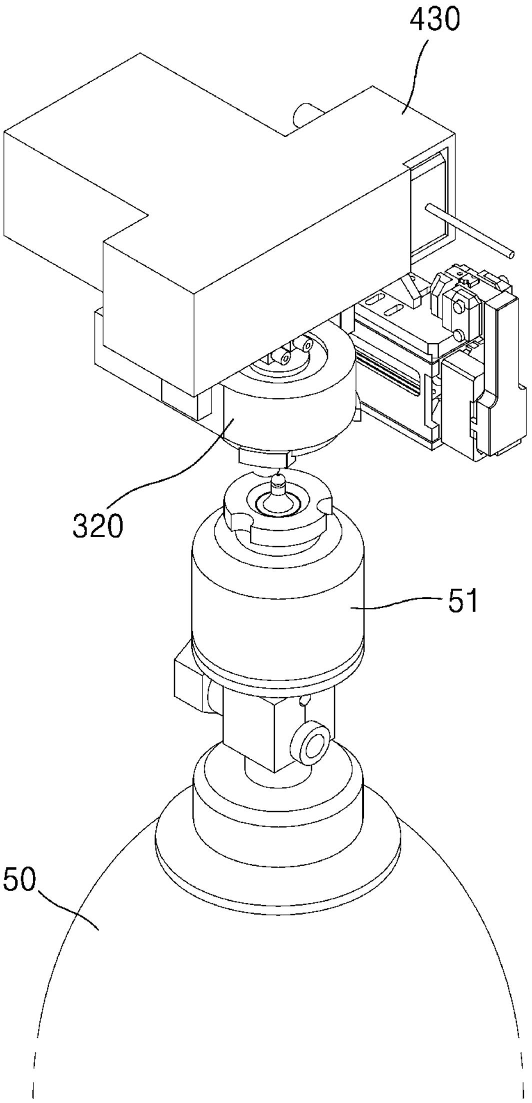
FIGS. 21 and 22 are a perspective view and a side view, schematically illustrating a state in which the valve manipulation module of FIG. 18 is being docked to a valve structure of the gas container according to some embodiments.
Figure 23:
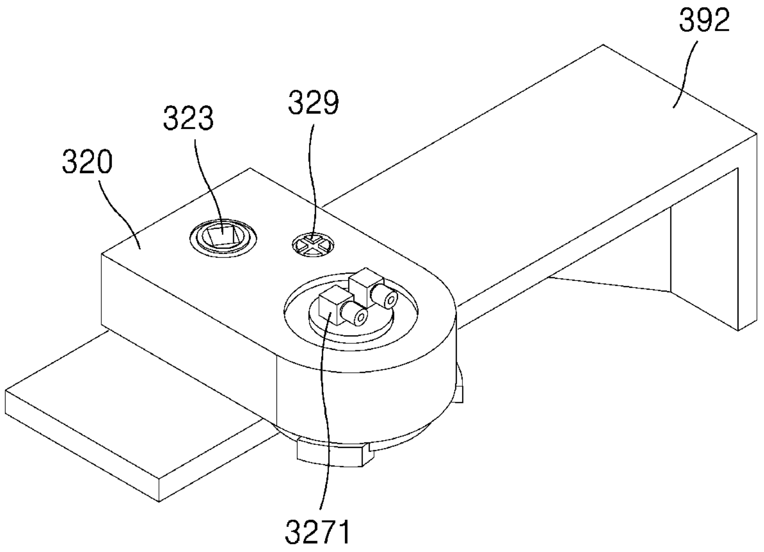
FIG. 23 is a perspective view schematically illustrating a state in which the valve manipulation module of FIG. 18 is mounted on a holder according to some embodiments.

FIGS. 18 and 19 are perspective views schematically illustrating a valve manipulation module 320 according to embodiments. FIG. 20 is a perspective view schematically illustrating a state in which the fastening vehicle 400 of FIG. 1 grips the valve manipulation module 320. FIGS. 21 and 22 are a perspective view and a side view, schematically illustrating a state in which the valve manipulation module 320 of FIG. 18 is being docked to the valve structure 51 of the gas container 50. FIG. 23 is a perspective view schematically illustrating a state in which the valve manipulation module 320 of FIG. 18 is mounted on a second holder 392.

Referring to FIGS. 18 to 23 together with FIGS. 1, 2, 6, 12, 13, 14, and 15, the valve manipulation module 320 may operate the valve structure 51 of the gas container 50 and open and close the valve structure 51.

In some embodiments, when the valve structure 51 includes a pneumatic valve, the valve structure 51 may include the locking handle 56. The valve manipulation module 320 may manipulate the valve structure 51 so that the locking handle 56 is controlled to be in any one of an unlocked position at which the diaphragm is allowed to ascend or descend and a locked position at which the diaphragm is not allowed to ascend or descend.

In some embodiments, when the valve structure 51 includes a simple on/off valve, the valve structure 51 may include the valve handle 57. The valve manipulation module 320 may manipulate the valve structure 51 so that the valve handle 57 is in any one of an open position at which a gas is allowed to be discharged via the valve nozzle 53 and a closed position at which the gas is not allowed to be discharged via the valve nozzle 53.

The valve manipulation module 320 may be detachably mounted to a second holder 392 installed on the inner wall of the cabinet frame 310. The valve manipulation module 320 may be gripped by the module gripper 430 of the fastening vehicle 400 and separated from the second holder 392. The valve manipulation module 320 gripped by the module gripper 430 may be configured to move together with the first multi-axis robot 420. The valve manipulation module 320 attached to the first multi-axis robot 420 through the module gripper 430 may then come into contact with the valve structure 51 of the gas container 50 or move to a nearby docking position. When the valve manipulation module 320 is in the docking position, the valve structure 51 may be manipulated using the valve manipulation module 320.

In some embodiments, both the holding module 330 and the valve manipulation module 320 may be mounted on a single holder such that the holder on which the holding module 330 is mounted is the same holder on which the valve manipulation module 320 is mounted, but the position at which the holding module 330 is mounted may be different from the position at which the valve manipulation module 320 is mounted.

Fittings may be installed at an end of the valve manipulation module 320 and/or at an end of the valve structure 51. The fittings provided in the valve manipulation module 320 and/or the valve structure 51 are designed to have a certain degree of freedom with respect to the horizontal direction so as to correct misalignment between the valve manipulation module 320 and the valve structure 51 in the horizontal direction.

In some embodiments, when the valve structure 51 includes a pneumatic valve, the valve manipulation module 320 may include a pneumatic connector 327 for providing air pressure to the pneumatic connector 55 of the valve structure 51. The pneumatic connector 327 may include a flow path 3271 through which the air pressure generated by a pneumatic pump is supplied.

When the valve structure 51 is in the docking position, the pneumatic connector 327 of the valve manipulation module 320 may be connected to the pneumatic connector 55 of the valve structure 51. The air pressure generated by the pneumatic pump of the valve manipulation module 320 may be supplied to a pneumatic line in the valve structure 51 via the pneumatic connector 327 of the valve manipulation module 320 and the pneumatic connector 55 of the valve structure 51. The diaphragm of the valve structure 51 is operated by air pressure supplied from the pneumatic pump of the valve manipulation module 320, and the diaphragm opens and closes the gas flow path in the valve structure 51.

The valve manipulation module 320 may include an operating lever 325 that is configured to engage with the locking handle 56 or the valve handle 57 of the valve structure 51 and rotate the locking handle 56 or the valve handle 57.

In some embodiments, when the valve structure 51 includes a simple on/off valve, the operating lever 325 may be configured to rotate the valve handle 57 between an open position and a closed position. As described above, the operating lever 325 may rotate the valve handle 57 to discharge or shut off the high-pressure gas.

In some embodiments, when the valve structure 51 includes a pneumatic valve, the operating lever 325 may be configured to rotate the locking handle 56 between an unlocked position and a locked position. As described above, when the locking handle 56 is in the locked position at which the diaphragm is not allowed to ascend or descend, the valve structure 51 is placed in a forcibly closed state. Therefore, the discharge of gas via the valve nozzle 53 of the valve structure 51 is restricted. When the locking handle 56 is in the unlocked position at which the diaphragm is allowed to ascend or descend, whether the valve structure 51 is opened or closed may be determined by the air pressure supplied via the pneumatic connector 327.

The power transmission shaft 433 of the module gripper 430 may be inserted into a second insertion portion 323 of the valve manipulation module 320. The power supplied from an actuator provided in the module gripper 430 may be transmitted to the operating lever 325 of the valve manipulation module 320 via the power transmission shaft 433.

The operating lever 325 may be rotated by the power transmitted from the power transmission shaft 433. When the valve manipulation module 320 is in the docking position, the operating lever 325 is positioned to engage with the locking handle 56 or the valve handle 57. In a state in which the operating lever 325 engages with the locking handle 56 or the valve handle 57, when the operating lever 325 is rotated by the power transmission shaft 433, the locking handle 56 or the valve handle 57, which engages with the operating lever 325, is rotated.

In some embodiments, a clutch device capable of connecting or disconnecting power transmission between the operating lever 325 and the power transmission shaft 433 may be installed between the operating lever 325 and the power transmission shaft 433. While the operating lever 325 of the valve manipulation module 320 engages with the locking handle 56 or the valve handle 57 of the valve structure 51, when the gas container 50 is rotated to perform an operation, such as aligning the gas container 50, the locking handle 56 or the valve handle 57 may be pressed against the operating lever 325 and unintentionally rotated to the unlocked position.

In order to prevent unintentional rotation of the locking handle 56 or the valve handle 57, the clutch device may disconnect the power transmission between the operating lever 325 and the power transmission shaft 433 when the gas container 50 rotates. When the power transmission between the operating lever 325 and the power transmission shaft 433 is disconnected, the operating lever 325 is in a freely rotatable state irrespective of a driving state of an actuator. Accordingly, during the rotation of the gas container 50, the locking handle 56 or the valve handle 57 is not rotated to the unlocked position by the operating lever 325.

A second vision mark 329 may be sensed by the vision sensor 437 of the module gripper 430 of the fastening vehicle 400. Specifically, before gripping the valve manipulation module 320 with the clamping mechanism 431, the fastening vehicle 400 may sense the second vision mark 329 attached to the valve manipulation module 320 using the vision sensor 437, thereby detecting the position of the valve manipulation module 320.

While the inventive concept has been particularly shown and described with reference to embodiments thereof, it will be understood that various changes in form and details may be made therein without departing from the spirit and scope of the invention.

What is claimed is:

1. A gas supply stage comprising:

a gas supply cabinet that comprises a cabinet frame and a holding module, wherein the cabinet frame comprises an inner space configured to house a gas container, and the holding module comprises a connector holder configured to be detachably fastened to a valve nozzle of a valve structure of the gas container and comprises a gas nozzle configured to be in fluid communication with a flow path of the valve nozzle when the connector holder is fastened to the valve nozzle; and a fastening vehicle that comprises a traveling unit configured to travel in a facility space in which the gas supply cabinet is installed, a multi-axis robot having a first end attached to the traveling unit and moving together with the traveling unit, and a module gripper mounted to a second end of the multi-axis robot and configured to detachably grip the holding module, wherein the module gripper comprises a clamping mechanism configured to grip the holding module and a power transmission shaft configured to be inserted into the holding module gripped by the clamping mechanism.

2. The gas supply stage of claim 1, wherein the holding module comprises a first insertion portion configured to receive the power transmission shaft.

3. The gas supply stage of claim 1, wherein the gas supply cabinet further comprises a first holder which is provided inside the cabinet frame and which is configured to be mounted by the holding module, and the first holder comprises a plug configured to fasten to the connector holder.

4. The gas supply stage of claim 1, wherein the gas supply cabinet further comprises a valve manipulation module located inside the cabinet frame, the valve manipulation module is configured to manipulate the valve structure between an open position at which a gas is allowed to be discharged via the valve nozzle and a closed position at which the gas is not allowed to be discharged via the valve nozzle, and the module gripper is configured to detachably grip the valve manipulation module and the holding module.

5. The gas supply stage of claim 4, wherein when the valve structure comprises a pneumatic valve configured to pneumatically control operation of a diaphragm that opens and closes a gas flow path inside the valve structure, the valve structure further comprises a locking handle configured to switch between an unlocked position at which the diaphragm is allowed to operate and a locked position at which the diaphragm is not allowed to operate, wherein the valve manipulation module comprises:

an operating lever connected to the module gripper and configured to rotate the locking handle of the valve structure between the unlocked position and the locked position; and a pneumatic connector configured to provide air pressure for operating the diaphragm to a pneumatic line inside the valve structure.

6. The gas supply stage of claim 4, wherein the holding module comprises a first vision mark, the valve manipulation module comprises a second vision mark, and the module gripper comprises a vision sensor configured to sense the first vision mark and the second vision mark.

7. The gas supply stage of claim 4, wherein the gas supply cabinet further comprises a second holder provided inside the cabinet frame and configured to be mounted by the valve manipulation module.

8. The gas supply stage of claim 1, wherein the module gripper further comprises a gasket gripper, and the gasket gripper is configured to grip a gasket and insert the gasket being gripped into an end of the gas nozzle of the connector holder.

9. The gas supply stage of claim 8, wherein the fastening vehicle further comprises a gasket feeder configured to provide a gasket to or collect the gasket from the gasket gripper, and the gasket feeder comprises a gasket loading box and a gasket disposal box.

10. The gas supply stage of claim 1, wherein the multi-axis robot comprises first to sixth rotation axes and is configured to adjust the position and tilt of the module gripper.

11. The gas supply stage of claim 1, wherein the number of gas containers accommodated in the gas supply cabinet is at least two.

12. The gas supply stage of claim 11, wherein the number of gas containers accommodated in the gas supply cabinet is equal to the number of holding modules.

13. The gas supply stage of claim 1, further comprising a superordinate system configured to receive a first signal for replacing the gas container from the gas supply cabinet and send a second signal to the fastening vehicle.

14. The gas supply stage of claim 13, wherein when the superordinate system receives the first signal for replacing the gas container from the gas supply cabinet, the superordinate system is further configured to send the fastening vehicle the second signal for separating the gas container from the holding module.

15. A gas supply stage comprising:

a gas supply cabinet that comprises a cabinet frame and a holding module, wherein the cabinet frame comprises an inner space in which a gas container is placed, and the holding module comprises a connector holder configured to be detachably fastened to a valve nozzle of a valve structure of the gas container and comprises a gas nozzle communicating with a flow path of the valve nozzle when the connector holder is fastened to the valve nozzle; and a fastening vehicle that comprises a traveling unit configured to travel in a facility space in which the gas supply cabinet is installed, a plurality of multi-axis robots each of which has a first end attached to the traveling unit and that moves together with the traveling unit, and a module gripper mounted to a second end of one of the plurality of multi-axis robots and that is configured to detachably grip the holding module, wherein the module gripper includes a power transmission shaft configured to be inserted into the holding module gripped by the module gripper.

16. The gas supply stage of claim 15, wherein the fastening vehicle comprises a first multi-axis robot and a second multi-axis robot, the first multi-axis robot is equipped with the module gripper, and the second multi-axis robot is equipped with a fastening module, wherein the fastening module is configured to apply an external force to the connector holder when the connector holder is fastened or separated.

17. The gas supply stage of claim 16, wherein the fastening module comprises a pressing unit configured to engage with the connector holder, and the pressing unit is located at a first end of the fastening module, and a second end of the fastening module on the opposite side from the first end of the fastening module is mounted to the second multi-axis robot.

18. The gas supply stage of claim 17, wherein when the pressing unit of the fastening module is configured to engage with the connector holder, the second multi-axis robot is configured to rotate the fastening module about the connector holder to fasten the connector holder to or separate the connector holder from the valve nozzle.

19. A gas supply stage comprising:

a plurality of gas supply cabinets, each of which comprises a cabinet frame comprising an inner space configured to receive a gas container, a valve manipulation module configured to manipulate a valve structure of a gas container placed in the inner space between an open position at which a gas is allowed to be discharged via a valve nozzle of the valve structure and a closed position at which the gas is not allowed to be discharged via the valve nozzle, and a holding module that comprises a connector holder that is configured to be detachably fastened to the valve nozzle and that comprises a gas nozzle communicating with a flow path of the valve nozzle when the connector holder is fastened to the valve nozzle; and a fastening vehicle that comprises a traveling unit configured to travel between the plurality of gas supply cabinets, a multi-axis robot having a first end attached to the traveling unit and moving together with the traveling unit, and a module gripper mounted to a second end of the multi-axis robot and configured to detachably grip the valve manipulation module and the holding module, wherein the module gripper of the fastening vehicle comprises a power transmission shaft configured to be inserted into the valve manipulation module or the holding module and to provide power to the valve manipulation module or the holding module into which the power transmission shaft is inserted, and the gas supply cabinet comprises a holder on which at least one of the valve manipulation module and the holding module is mounted.

* * * * *